US007685157B2

(12) United States Patent
Uchiyama et al.

(10) Patent No.: US 7,685,157 B2
(45) Date of Patent: Mar. 23, 2010

(54) EXTRACTION OF INFORMATION FROM STRUCTURED DOCUMENTS

(75) Inventors: Tadasu Uchiyama, Yokosuka (JP); Masaru Miyamoto, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 262 days.

(21) Appl. No.: 10/463,521

(22) Filed: Jun. 18, 2003

(65) Prior Publication Data

US 2004/0044963 A1 Mar. 4, 2004

(30) Foreign Application Priority Data

Jun. 28, 2002 (JP) ............................. 2002-190621
Jul. 12, 2002 (JP) ............................. 2002-204641

(51) Int. Cl.
*G06F 7/00* (2006.01)
*G06F 17/00* (2006.01)
*G06F 17/20* (2006.01)

(52) U.S. Cl. ..................... 707/104.1; 707/3; 715/252

(58) Field of Classification Search ................ 707/10, 707/513; 709/224, 203; 715/854, 513; 725/116
See application file for complete search history.

(56) References Cited

U.S. PATENT DOCUMENTS

| 5,765,177 | A | | 6/1998 | Nakatsuyama et al. |
| 5,778,400 | A | * | 7/1998 | Tateno .......................... 715/513 |
| 6,061,697 | A | | 5/2000 | Nakao |
| 6,456,308 | B1 | * | 9/2002 | Agranat et al. .............. 715/854 |
| 6,549,944 | B1 | * | 4/2003 | Weinberg et al. ........... 709/224 |
| 6,628,304 | B2 | * | 9/2003 | Mitchell et al. ............. 715/734 |
| 6,678,692 | B1 | * | 1/2004 | Hyatt .......................... 707/102 |
| 6,704,723 | B1 | * | 3/2004 | Alavi et al. ..................... 707/3 |

(Continued)

FOREIGN PATENT DOCUMENTS

JP 4-280360 10/1992

(Continued)

OTHER PUBLICATIONS

L. Iocchi, Journal of Network and Computer Applications, vol. 22, pp. 259-269, "The Web-OEM Approach to Web Information Extraction", Sep. 1999.

(Continued)

*Primary Examiner*—Apu M Mofiz
*Assistant Examiner*—Susan Y Chen
(74) *Attorney, Agent, or Firm*—Oblon, Spivak, McClelland, Maier & Neustadt, L.L.P.

(57) ABSTRACT

A method of extracting information from a structured document includes the steps of assigning a partial tree identifier inclusive of a tag identifier to a selected partial tree wherein the tag identifier includes a name of a tag corresponding to a root of the selected partial tree, a name of at least one format attribute of the tag, and a value of the at least one format attribute, arranging names of format attributes in a predetermined order in the tag identifier if the at least one format attribute of the tag includes two or more format attributes, and identifying a partial tree having a partial tree identifier identical to the partial tree identifier of the selected partial tree from a list of partial tree identifiers of partial trees that exist in the structured document after updating thereof.

6 Claims, 27 Drawing Sheets

U.S. PATENT DOCUMENTS

| | | | |
|---|---|---|---|
| 6,732,153 B1 * | 5/2004 | Jakobson et al. | 709/206 |
| 6,910,027 B2 * | 6/2005 | Bromberg et al. | 706/46 |
| 6,961,909 B2 * | 11/2005 | Lord et al. | 715/853 |
| 2001/0056460 A1 | 12/2001 | Sahota et al. | |
| 2002/0029229 A1 | 3/2002 | Jakopac et al. | |
| 2003/0220914 A1 * | 11/2003 | De Angelis et al. | 707/3 |

FOREIGN PATENT DOCUMENTS

| | | |
|---|---|---|
| JP | 6-52161 | 2/1994 |
| JP | 10-171800 | 6/1998 |
| JP | 10-187753 | 7/1998 |
| JP | 11-85690 | 3/1999 |
| JP | 2001-282773 | 10/2001 |
| JP | 2002-123418 | 4/2002 |

OTHER PUBLICATIONS

P. Merrick, et al., http://www.w3.org/TR/NOTE-WIDL, 12 pages, "Web Interface Definition Language (WIDL)", Sep. 22, 1997.

* cited by examiner

FIG.2

TEXT INDICATIVE OF START POINT

THURSDAY, 5/29/2002

Cameroon Team Departure Behind Schedule

[Bangkok Kyodo] The chartered flight with the Cameroon World-cup soccer team on board arrived at Bangkok for refueling on the morning of May 23rd. The flight is at least two hours behind schedule, and its departure is currently expected to be on or after 13:00, local time (15:00 Japan time), according to officials at the Bangkok International Airport.... (Kyodo News Service)

TO PREVIOUS ARTICLE>>

TEXT INDICATIVE OF END POINT

⇩ UPDATE

TEXT INDICATIVE OF START POINT CHANGED THROUGH UPDATING

FRIDAY, 6/24/2002

Cameroon Team Arrived 5 Days Late

The Cameroon World-cup soccer tem, having lagged behind schedule, finally arrived at Nakatsue Mura, the scheduled camp site, around 3:00 a.m. on May 24th. Its arrival was 5 days late. Village people of an expected number of 150 turned out at the sports center where the team is staying, and welcomed the team by waving the Cameroon's national flags, despite the late hour at night···. (Kyodo News Service)

TO PREVIOUS ARTICLE>>

TEXT INDICATIVE OF END POINT

FIG.3A

TEXT INDICATIVE OF START POINT

THURSDAY, 5/29/2002

Cameroon Team Departure Behind Schedule

[Bangkok Kyodo] The chartered flight with the Cameroon World-cup soccer team···. (Kyodo News Service)

TO PREVIOUS ARTICLE>>

TEXT INDICATIVE OF END POINT

FIG.3B

```
<TABLE cellSpacing=0 cellPadding=0 width="100%" border=0>
<TBODY>
<TR>
<TD vAlign=top>
<TABLE cellSpacing=0 cellPadding=3 width="100%" border=0>
<TBODY>
<TR vAlign=top><TD><FONT size=-1>THURSDAY, 5/23/2002</FONT></RD></TR>
<TR><TD><B>Cameroon Team Departure Behind Schedule</B></TD></TR>
<TR vAlign=top><TD><DIV class=line> [Bangkok Kyodo] The chartered flight with the Cameroon World-cup soccer team···
(Kyodo News Service)<BR></DIV></TD></TR>
</TBODY>
</TABLE>
<TABLE cellSpacing=0 cellPadding=0 width="95%" border=0>
<TBODY>
<TR>
<TD align=right>
<A href="/news/kyodo/sports/20020523/20020523tu055.html"><FONT color=black size=-1>TO PREVIOUS ARTICLE>>
</FONT></A>
</TD>
</TR>
</TBODY>
</TABLE>
</TD>
</TR>
</TBODY>
</TABLE>
```

INCONSISTENCY OF TAGS IN EXTRACTED PORTION

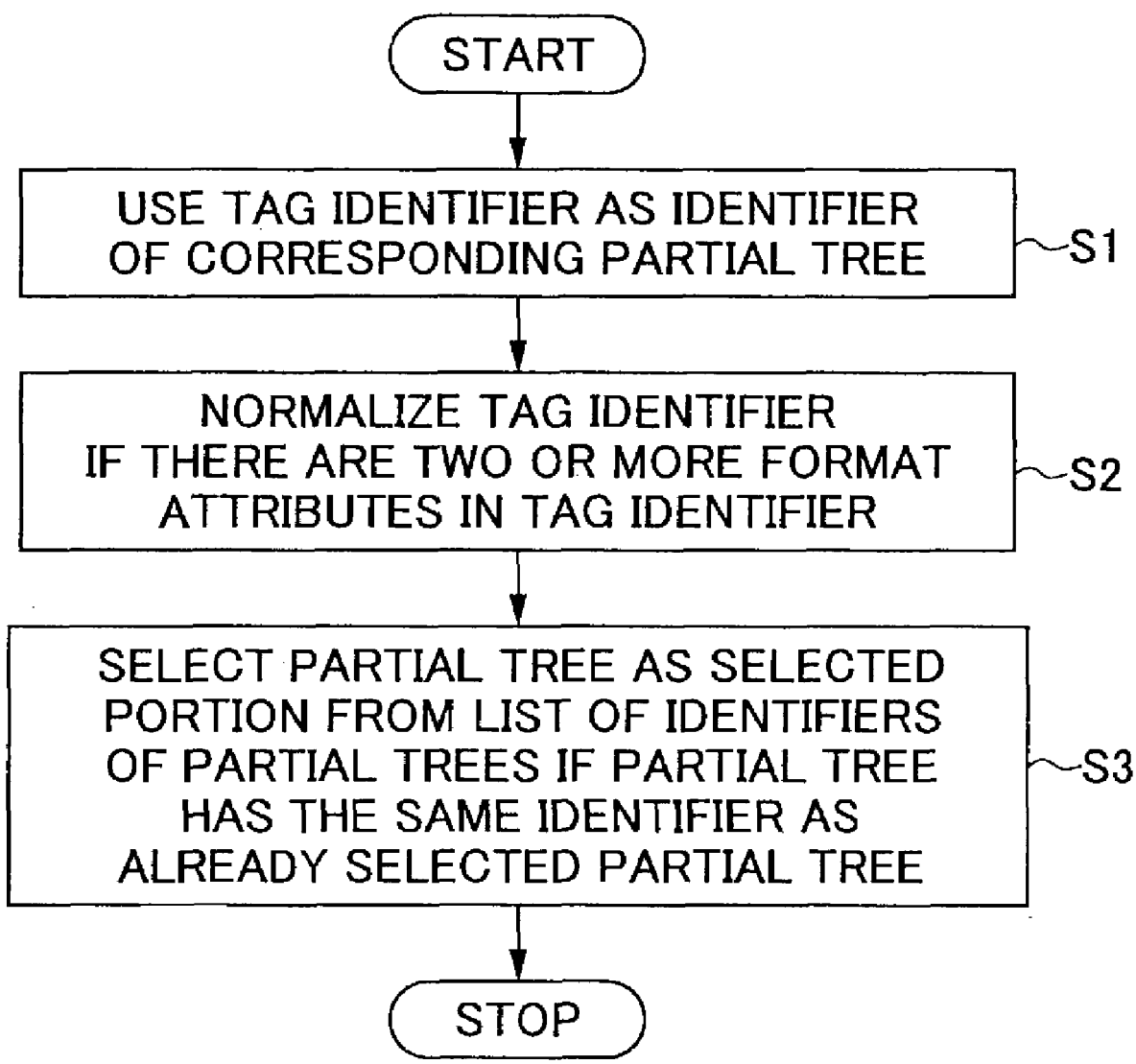

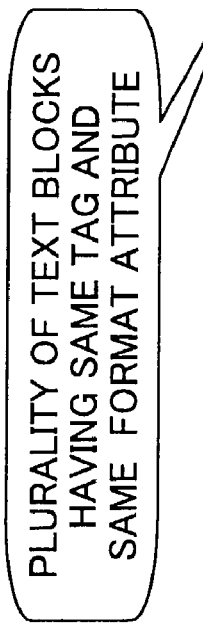

| COORDINATES OF SELECTED AREA (TOP LEFT POINT X, Y, WIDTH, HEIGHT) | PARTIAL TREE IDENTIFIER |
|---|---|
| 0, 0, 100, 50 | table_border=0&cellpadding=1 |
| (OMIT) | |

FIG.9

DOCUMENT

```
<table border="1" cellpadding="1">
<table border="0" cellpadding="1">
(OMIT)...LOCAL NEWS....(OMIT)
</table>
</table>
```

⇒

TREE STRUCTURE DATA

OBJECT ID, LABEL, (CHILD NODE LIST), PARTIAL TREE IDENTIFIER
0, doc, (1), cod
1, table, (2), table_border=1&cellpadding=1
2, table, (3), table_border=0&cellpadding=1
3, (OMIT)...LOCAL NEWS...(OMIT), (NONE),

FIG.10

| DOCUMENT PORTION ID | URL | PARTIAL TREE IDENTIFIER |
|---|---|---|
| 1 | http://abc/ | table_border=0&cellpadding=1 |
| 2 | http://xyz/ | table_border=1&cellpadding=2 |
| | (OMIT) | |

FIG.11

| TAG IDENTIFIER |
|---|
| border="1"cellpadding="2" |
| border="0"cellpadding="1" |
| (OMIT) |

FIG.12

DOCUMENT

```
<table border="1" cellpadding="2">
(OMIT)...[ADVERTISEMENT].....(OMIT)
</table>
<table border="0" cellpadding="1">
(OMIT)....MAIN NEWS....(OMIT)
</table>
```

TREE STRUCTURE DATA

OBJECT ID, LABEL, (CHILD NODE LIST), PARTIAL TREE IDENTIFIER
0, doc, (1, 2), cod
1, table, (3), border="1" cellpadding="2"
2, table, (4), border="0" cellpadding=1

3, (OMIT)...[ADVERTISEMENT]...(OMIT), (NONE),
4, (OMIT)...MAIN NEWS...(OMIT), (NONE),

```
<table border="1" cellpadding="1">
  <table border="0" cellpadding="1">
  (OMIT)....MAIN NEWS....(OMIT)
  </table>
  <table border="0" cellpadding="1">
  (OMIT)....LOCAL NEWS....(OMIT)
  </table>
</table>
```

PARTIAL TREE IDENTIFIER OF SELECTED PORTION doc.table_border=1&cellpadding=1[0].table_border=0&cellpadding=1[1]

FIG.16

```
<table border="1" cellpadding="1">
  <table border="0" cellpadding="1">
  (OMIT)....MAIN NEWS....(OMIT)
  </table>
  <table border="0" cellpadding="1">
  (OMIT)....LOCAL NEWS....(OMIT)
  </table>
</table>
```

TREE STRUCTURE DATA

OBJECT ID, LABEL, (CHILD NODE LIST), PARTIAL TREE IDENTIFIER
0, doc, (1), doc
1, table, (2), doc:table¥border=1&cellpadding=1[0]
2, table, (4), doc:table_border=1&cellpadding=1[0].table_border=0&cellpadding=1[0]
3, table, (5), doc:table_border=1&cellpadding=1[0].table_border=0&cellpadding=1[1]
4, (OMIT)....MAIN NEWS....(OMIT), (NONE),
5, (OMIT)....LOCAL NEWS....(OMIT), (NONE), FIG.19
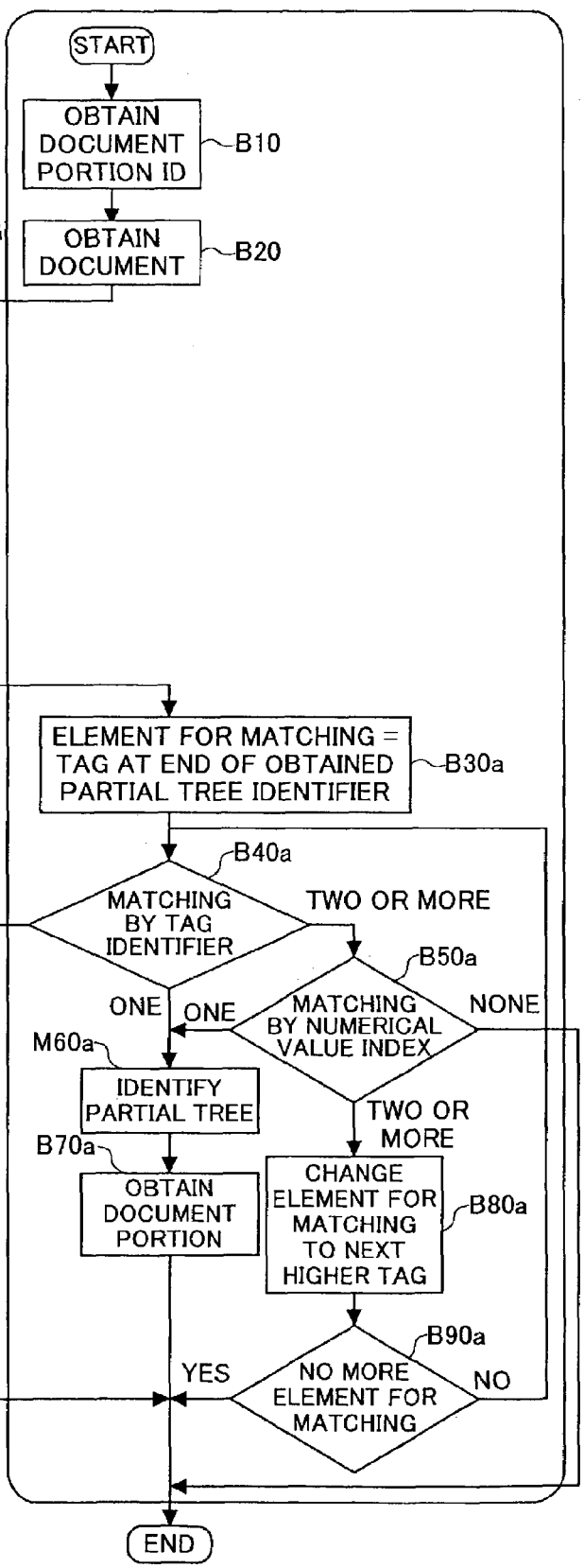
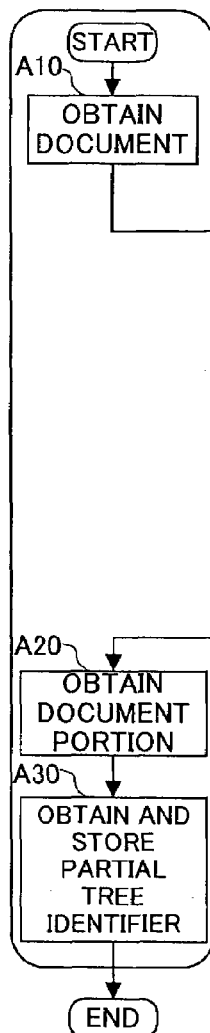
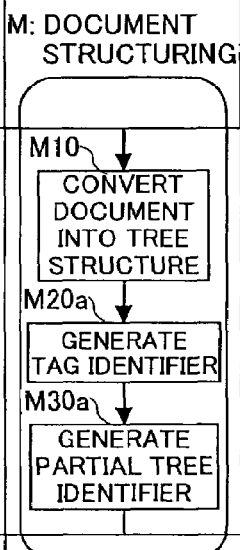

FIG.29
HTML SOURCE
```
<html>
  <head>
    <title>
      sample
    </title>
  </head>
  <body>
    <table border=1>
      <tr>
        <td>
        fruits
        </td>
        <td>
          <table border=1>
            <tr>
              <td>
                apple
              </td>
            </tr>
            <tr>
              <td>
                orange
              </td>
            </tr>
          </table>
        </td>
      </tr>
    </table>
  </body>
</html>
```
BROWSER PRESENTATION
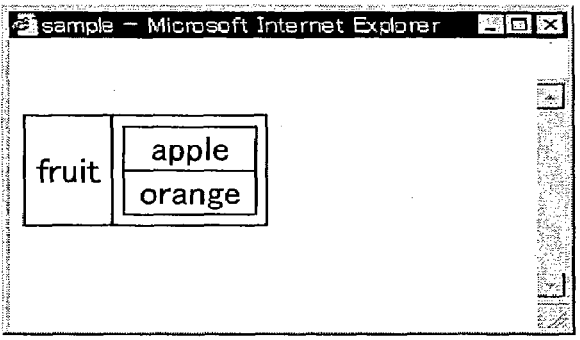
TREE STRUCTURE
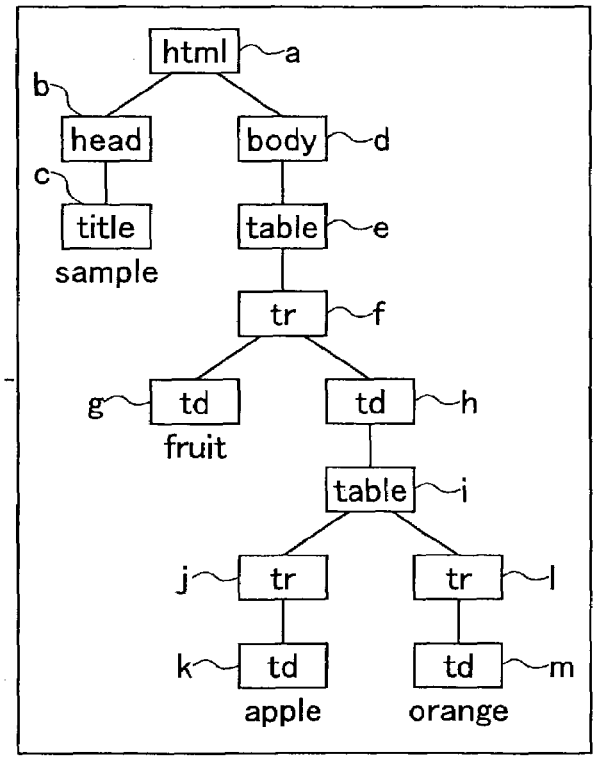

EXTRACTION OF INFORMATION FROM STRUCTURED DOCUMENTS

BACKGROUND OF THE INVENTION

1. Field of the Invention

The present invention generally relates to a method of extracting information from structured documents such as HTML documents or the like, and particularly relates to an information extraction method that identifies and extracts a desired text portion selected in advance from daily updated structured documents. Further, the present invention relates to a user interface by which a desired portion can readily be selected in a structured document.

2. Description of the Related Art

There are needs for a means to select a particular portion from a structured document such as an HTML (hyper text markup language) document or the like that is daily updated. For example, a user may wish to select portions of particular interest from Web pages that the user is familiar with, putting these portions together to create a collection of information which allows the user to readily view only necessary information. When the source of collected information is daily updated, the selected portion needs to be identified again and again in the daily updated document for use in the collection.

Japanese Patent No. 2867986 directed to a WWW information extraction system teaches storing information indicative of a start point and an end point of a portion selected in advance. Based on this information, the start point and the end point are identified in the updated document, followed by extracting the portion existing between these two points as the selected portion. For example, texts corresponding to the start point and the end point, respectively, of the selected portion are stored in memory. When extracting the selected portion from the document, the stored texts are used to identify the start point and the end point in the HTML document, followed by extracting the identified portion.

A system proposed by webMethods corporation (http://www.w3.org/TR/NOTE-widl) and a system proposed by Luca Iocchi (Luca Iocchi: The Web-OEM approach to Web information extraction, Journal of Network and Computer Applications, Vol. 22, pp. 259-269 (1999)) approach this issue by converting an HTML document into a tree structure, storing information about a partial tree corresponding to a portion selected in advance, and identifying a portion of the updated document that corresponds to the stored partial tree. Here, information about a partial tree is comprised of a character string serving as an identifier of the selected portion. A tag name is used as a tag identifier, and tag names at the same hierarchical level in the tree structure are provided with respective numerical value indexes. The tag names paired with the numerical value indexes are connected in series to make the character string for representation of a structure from the root of the whole tree to the root of the partial tree, which corresponds to the selected portion. In an example of FIG. 1, "doc" is regarded as the root of the whole tree, and the identifier that points to the selected portion "local news" is represented as "doc.table[0].table[0]".

In the related-art method disclosed in Japanese Patent No. 2867986 regarding the WWW information extraction system, a selected portion is extracted based on the information indicative of the start point and end point of the selected portion. It naturally follows that such information needs to be an item that always remains intact in the document after updating. It is difficult, however, to identify enduring information that is unchanged through updating. Many exceptions exist on homepages on the Internet as designs of such homepages tend to be at the designers' discretion, so that the method as described above may not be applicable to a wide range of application areas.

If texts corresponding to the start and end points are used as a clue in the WWW information extraction system, these texts themselves may be subjected to updating as shown in FIG. 2. In such a case, this method fails.

Further, if a selected portion is extracted as shown in FIG. 3A by this method, the extracted portion does not constitute a proper partial tree as a tree structure, an example of which is shown in FIG. 3B. Because of this, difficulties would be encountered if an attempt is made to make use of this extracted portion in another structured document.

The method utilizing the identifier of a partial tree of a selected portion as taught by the webMethods corporation or Luca Iocchi relies on the premise that the document structure does not change through updating. If the document structure ever slightly changes through updating, the identifier of a partial tree selected in advance will not match an identifier after updating.

For example, a text block having the same tag as an existing tag may be inserted into the same hierarchical level of the tree structure to which the selected portion of the document belongs. This results in a numerical value index of the tag being changed in the identifier of the partial tree. In the example of FIG. 1, the document is updated by inserting the text regarding "ADVERTISEMENT 2" bracketed in table tags above the selected portion. As a result, the numerical value index of the tag identifier based on the tag name "table" in respect of the selected "local news" is change from "table[0]" to "table[1]". Such small format changes are likely to be made on a site top page where banners, breaking news, etc., are inserted and deleted constantly. Since such a site as having constant updating of information is the very kind of site that users wish to select portions from, the degradation of reliability of portion identification needs to be addressed if such degradation occurs through minor updating.

When a tag that was not in existence at the time of the portion selection is inadvertently left open above the selected portion, this tag appears as a parent node relative to the selected portion. In the example of updating shown in FIG. 1, the table tag inclosing "ADVERTISEMENT 1" above the selected portion is inadvertently left open. As a consequence, an identifier that should correctly appear as "doc.table[0].table[0]" becomes "doc.table[0].table[0].table[1]", which indicates the existence of a table tag as a parent node of the selected portion "local news". This makes the identifier of the partial tree fail to match between before and after updating. WWW browsers widely used today permit open-ended tags, and page designers often update pages without noticing the fact that open-ended tags are present in the pages.

Insertion of a text block having the same tab and inadvertent lack of a closing tag causes a trouble in the example of updating of the document shown in FIG. 1. Namely, the identifier of a partial tree that points to the selected portion is changed from "doc.table[0].table[0]" to "doc.table[0].table[0].table[1]".

The methods proposed by the webMethod corporation and Iocchi further have a problem in that knowledge of tags and document structures and skill are necessary when selecting a portion in a structured document such as an HTML document.

SUMMARY OF THE INVENTION

It is a general object of the present invention to substantially obviate one or more problems caused by the limitations and disadvantages of the related art.

It is another and more specific object of the present invention to provide a method of extracting information from a structured document that can extract a selected portion without having reliability degraded through updating of the document.

It is still another object of the present invention to provide a method of selecting and extracting a portion from a structured document by which the user can select the portion of the structured document such as an HTML document in a manner that is intuitively easy to understand.

According to the invention, a tag identifier is comprised of a name of a tag, a name of at least one format attribute of the tag, and a value of the at least one format attribute, and is used as a partial tree identifier. With this partial tree identifier, the reliability of portion extraction is not degraded because the start and end points are not relied upon. It suffices to have only a different format attribute for a tag even if a text block having the same tag as the partial tree of a selected portion is inserted into the same hierarchical level where the selected portion belongs.

Further, numerical value indexes are generated that indicate the sequence numbers of tag identifiers belonging to the same hierarchical level of the tree structure. A tag identifier and a numerical value index are paired as a set, and a plurality of sets are connected in series from the root of the whole tree structure to the root of a partial tree, thereby providing the partial tree identifier. With this provision, it is possible to uniquely identify the selected portion even if the same combination of a tag and format attributes that corresponds to the root of the selected partial tree is used for other tags in the document.

If there are two or more matching partial trees at the time of identifying a partial tree, the matching of identifiers is recursively performed by successively ascending to a next higher parent node. This makes it possible to avoid the degradation of the reliability of portion extraction even if there is a tag that is inadvertently left open above the selected portion.

According to another aspect of the present invention, the system for selecting and extracting a portion of a structured document such as an HTML document detects an end node of a tree structure that corresponds to a position indicated by a user on the screen displaying the structured document. A series of ancestor nodes are successively obtained for visual presentation on the screen, and the user is prompted to select a node. This allows the user to easily select a portion of the structured document according to node selection, so that the selected portion will be readily reused in another structured document.

Other objects and further features of the present invention will be apparent from the following detailed description when read in conjunction with the accompanying drawings.

BRIEF DESCRIPTION OF THE DRAWINGS

FIG. 2 is an illustrative drawing showing an example in which a portion of a document is selected and extracted by using the texts indicative of start and end points;

FIGS. 3A and 3B are illustrative drawings showing an example in which a portion of an HTML document is extracted by using the texts indicative of start and end points;

FIG. 4 is a flowchart showing a schematic of the present invention;

FIG. 5 is an illustrative drawing for explaining a case in which a plurality of tags have the same tag and attribute formats;

FIG. 9 is a drawing showing an example of a tree-structure data generated by the document structure analysis of the first embodiment of the present invention;

FIG. 10 is a drawing showing the contents of the portion-information storage unit according to the first embodiment of the present invention;

FIG. 11 is a drawing showing an example of an element list according to the first embodiment of the present invention;

FIG. 12 is a drawing showing an example of a converted tree-data structure according to the first embodiment of the present invention;

FIG. 16 is an illustrative drawing showing the generation of partial tree data according to a second embodiment of the present invention;

FIG. 19 is a flowchart of a method of extracting information from a structured document according to the third embodiment of the present invention;

FIG. 29 is an illustrative drawing showing an example of an HTML source, an associated tree structure, and associated browser presentation.

DESCRIPTION OF THE PREFERRED EMBODIMENTS

In the following, embodiments of the present invention will be described with reference to the accompanying drawings.

FIG. 4 is a flowchart showing a schematic of the present invention.

A method of extracting information from a structured document according to the present invention converts a document into a tree structure, and generates an identifier of a partial tree corresponding to a portion of the document, thereby specifying any desired portion of the structured document in advance and providing a basis for subsequently identifying the selected portion from the updated document.

As shown in FIG. 4, this method uses a tag identifier as an identifier of a partial tree where the tag identifier is comprised of a tag name corresponding to the root of the partial tree, names of one or more format attributes of the tag, and the values of the format attributes (step 1). If there are a plurality of format attributes for the tag identifier, the format attributes are arranged in a predetermined order (e.g., alphabetical order) of the format attribute names to normalize the tag identifier (step 2). A partial tree having the same identifier as the already selected partial tree is identified as the selected portion from the list of identifiers of partial trees that exist in the document converted into a tree structure (step 3).

If the same combination of a tag name and format attributes that represent the root of the selected partial tree is used for two or more tags in the document as shown in FIG. 5, numerical value indexes are generated that indicate the sequence numbers of tag identifiers belonging to the same hierarchical level of the tree structure. A tag identifier and a numerical value index are paired as a set, and a plurality of sets are connected in series from the root of the whole tree structure to the root of the selected partial tree, thereby providing the identifier of the partial tree.

There is then a need to identify the partial tree having the same identifier as the already selected partial tree from a list of identifiers of partial trees that are present in the document converted into a tree structure. Matching of partial tree identifiers is performed by taking into consideration only the tag identifier of the root of the selected partial tree. If there are two or more partial trees that match the selected partial tree, then, the numerical value index associated with the tag identifier is matched to screen the candidates. If more than one candidate still remains after the screening of candidates based on the utilization of the numerical value index, a parent-node tag is then taken into consideration for matching of identifiers. The matching of identifiers is recursively performed by ascending to successive ancestor nodes until only one partial tree remains as a candidate. This remaining tree is identified as the selected partial tree.

First Embodiment

Figure 1:
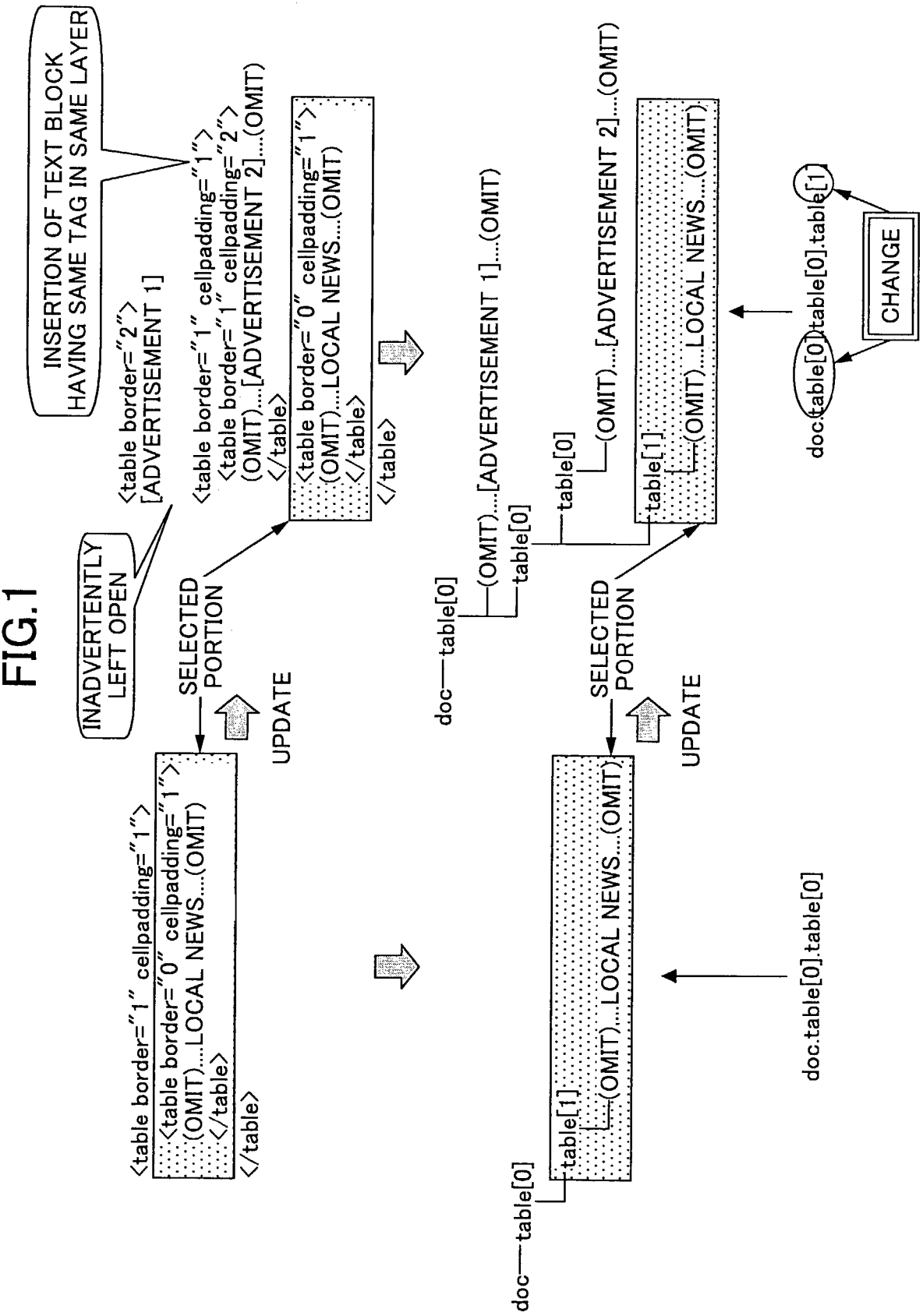
FIG. 1 is an illustrative drawing for explaining the related art.
Figure 6:
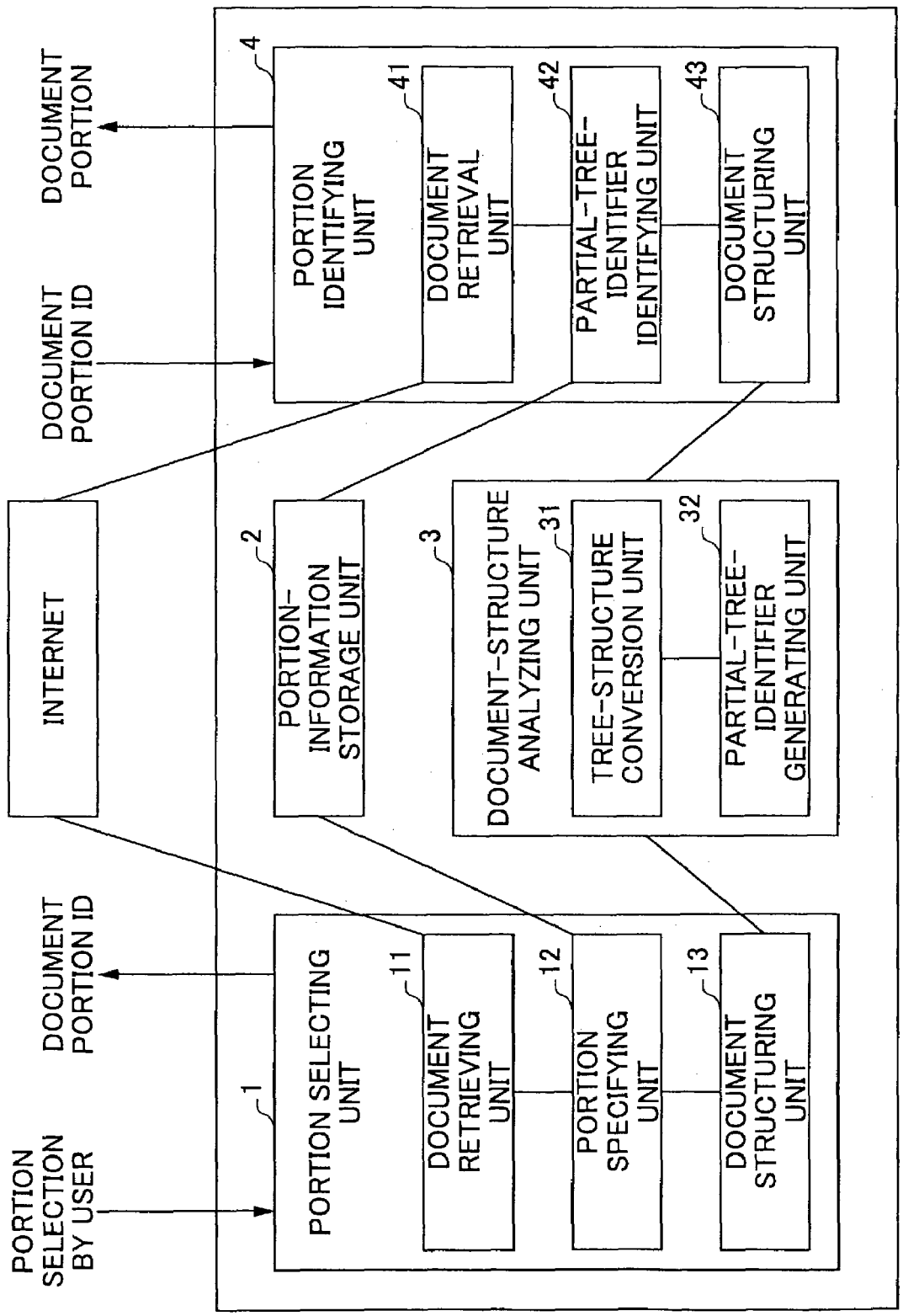
FIG. 6 is a block diagram of a system for extracting information from a structured document according to a first embodiment of the present invention.

FIG. 6 is a block diagram of a system for extracting information from a structured document according to the first embodiment of the present invention.

In the system as shown, the reliability of portion extraction is degraded since it operates based on a method independent of the start and end positions of a selected portion. Namely, it suffices to have only different format attributes for a tag even if a text block having the same tag as the partial tree of the selected portion is inserted into the same hierarchical level where the selected portion belongs.

The system of FIG. 6 includes a portion selecting unit 1 for receiving instruction from a user that selects a portion in a structured document, a portion-information storage unit 2 for storing information about the selected portion, a document-structure analyzing unit 3 which identifies a partial tree in the tree structure by use of tags and associated format attributes, and a portion identifying unit 4 for returning a document portion corresponding to the selected portion upon user request.

The portion selecting unit 1 includes a document retrieving unit 11, a portion specifying unit 12, and a document structuring unit 13.

The document retrieving unit 11 receives a request for document retrieval from the portion specifying unit 12 where the request specifies a URL (uniform resource locator) serving as an identifier of a document. The document retrieving unit 11 then retrieves the requested document, and gives it to the portion specifying unit 12.

Figures 7, 8:
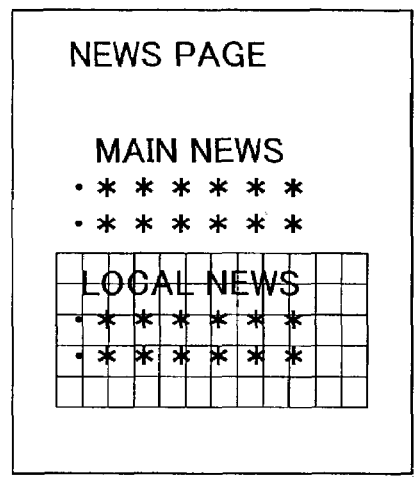
FIG. 7 is an illustrative drawing showing an example of a displayed page for portion selection according to the first embodiment of the present invention.
FIG. 8 is a drawing showing an example of information stored in the portion-information storage unit according to the first embodiment of the present invention.

The portion specifying unit 12 sends to the document retrieving unit 11 a request for document retrieval with a URL, and obtains the document. The portion specifying unit 12 then requests the document structuring unit 13 to structure the document, and obtains the document converted into a tree structure. As shown in FIG. 7, the portion specifying unit 12 provides a user interface that helps the user to specify a portion in the document. An identifier of a partial tree is generated according to the coordinates or the like of the specified portion. This identifier together with the URL are stored in the portion-information storage unit 2 as shown in FIG. 8.

The document structuring unit 13 requests the document-structure analyzing unit 3 to structure the document that is received from the portion specifying unit 12. The document structuring unit 13 then receives the document converted into a tree structure as a data structure representing parent-child relations in the tree structure as shown in FIG. 9. For example, tags and text elements constituting the tree structure are represented by an object ID, a label, a child-node list, and a partial tree identifier. A list of these items is received as the data structure.

The portion-information storage unit 2 receives the URL and the partial tree identifier from the portion specifying unit 12, and assigns a document portion ID for identifying the set of the URL and the partial tree identifier. This set and the assigned document portion ID are stored as shown in FIG. 10. The document portion ID is then returned to the portion specifying unit 12.

The document-structure analyzing unit 3 includes a tree-structure conversion unit 31 and a partial-tree-identifier generating unit 32.

The tree-structure conversion unit 31 receives a document structuring request together with the structured document from the document structuring unit 13 or 43. The tree-structure conversion unit 31 converts the received document into a tree structure having tags and texts as document elements, and sends the converted document to the partial-tree-identifier generating unit 32.

The partial-tree-identifier generating unit 32 generates a tag identifier for each tag constituting the document that is converted into the tree structure by the tree-structure conversion unit 31. The tag identifier is comprised of a tag name, a name of a format attribute, and a value of the format attribute.

In an example of FIG. 9, the first "table" tag is given a tag identifier "table_border=0 &cellpadding=1", which combines a tag name "table" and format attributes and their values 'border="0" cellpadding="1"'. If there are two or more format attributes, they are arranged in a predetermined order of the format attribute names to normalize the tag identifier. The tag identifier obtained in this manner is used as an identifier of a partial tree that has this tag as its root, and is matched with a corresponding tree-structure element. Tree-structure data inclusive of partial tree identifiers as shown in FIG. 9 is then send to the document structuring unit 13 or 43.

The portion identifying unit 4 includes a document retrieval unit 41, a partial-tree-identifier identifying unit 42, and the document structuring unit 43.

The document retrieval unit 41 receives a document retrieval request together with a URL serving as a document identifier from the partial-tree-identifier identifying unit 42. Upon receipt of the request, the document retrieval unit 41 obtains the document from the Internet, and returns the document to the partial-tree-identifier identifying unit 42.

The partial-tree-identifier identifying unit 42 receives a portion retrieval request together with the document portion ID from the user, and transfers the document portion ID to the portion-information storage unit 2 to obtain the relevant URL and the corresponding partial tree identifier. The partial-tree-identifier identifying unit 42 supplies the URL to the document retrieval unit 41 to obtain the corresponding document. A request is then sent to the document structuring unit 43 for structuring of the obtained document, and a list of elements of the converted tree structure as shown in FIG. 11 is obtained in response. The partial-tree-identifier identifying unit 42 extracts a tag from the obtained list of elements by finding the tag that corresponds to the partial tree identifier. The partial-tree-identifier identifying unit 42 then provides the user with a document portion corresponding to the partial tree belonging to the extracted tag.

The document structuring unit 43 requests the document-structure analyzing unit 3 to structure the document that is received from the partial-tree-identifier identifying unit 42. The document structuring unit 43 then receives the document converted into a tree structure as a data structure representing parent-child relations in the tree structure as shown in FIG. 12. For example, tags and text elements constituting the tree structure are represented by an object ID, a label, a child-node list, and a partial tree identifier. A list of these items is received as the data structure.

In the following, an operation of the system will be described.

Figure 13:
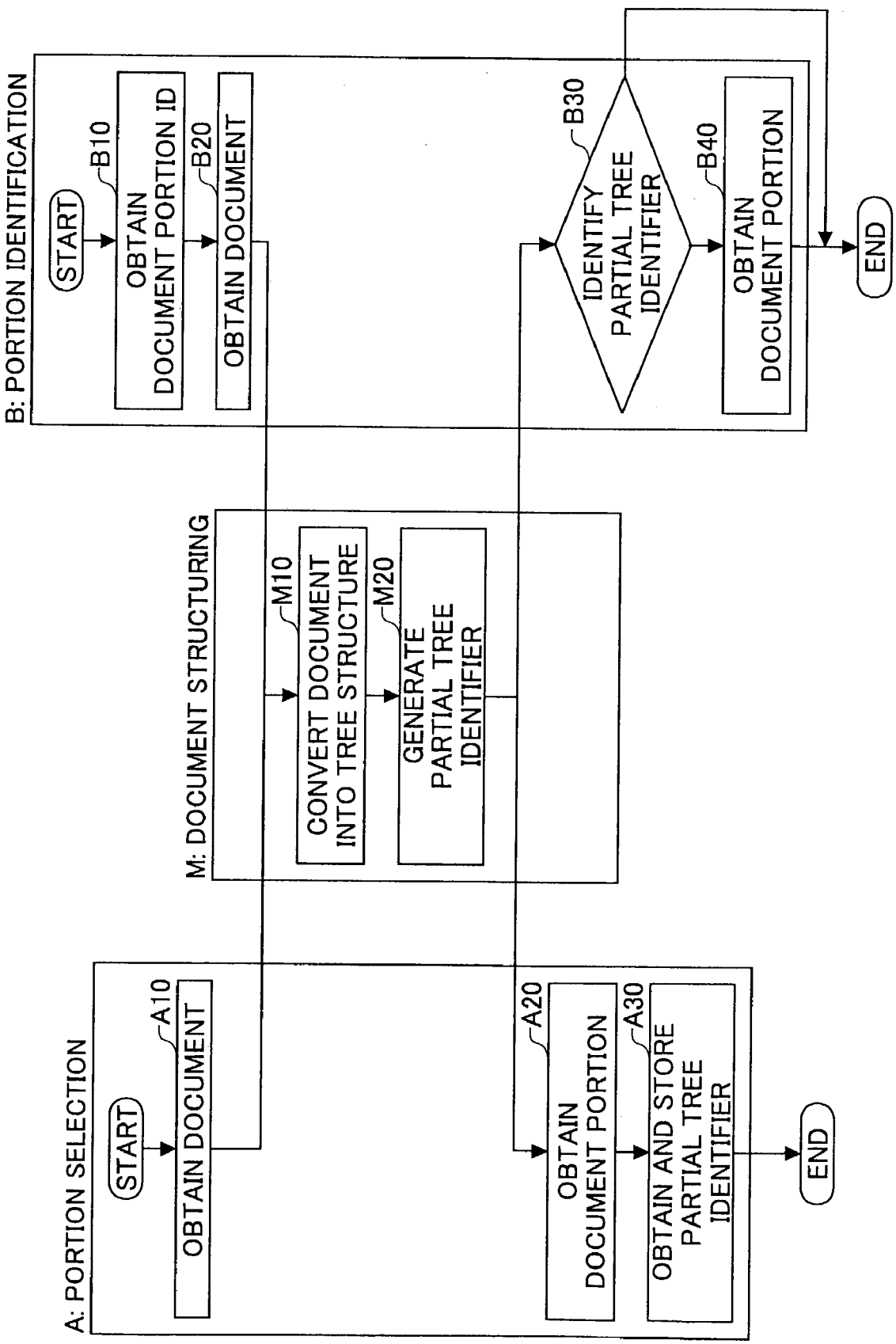
FIG. 13 is a flowchart of a method of extracting information from a structured document according to the first embodiment of the present invention.

FIG. 13 is a flowchart of a method of extracting information from a structured document according to the first embodiment of the present invention.

This operation includes a portion selection process A, a portion identification process B, and a document structuring process M. In the following, steps will be described with one of the three designations A, B, and M.

First, the portion selection process A will be described.

At step A10, the portion specifying unit 12 responds to a user instruction with an associated URL by having the document retrieving unit 11 obtain a document corresponding to the URL from the Internet. The portion specifying unit 12 sends the received document to the document structuring unit 13 for structuring of the document. The procedure goes to step M10.

At step M10, the tree-structure conversion unit 31 receives the structured document from the document structuring unit 13, and converts the document into a tree structure having tags and texts as document elements, which is supplied to the partial-tree-identifier generating unit 32. The procedure then goes to step M20.

At step M20, the partial-tree-identifier generating unit 32 generates a tag identifier for each tag constituting the document that is converted into the tree structure by the tree-structure conversion unit 31. The tag identifier is comprised of a tag name, a name of a format attribute, and a value of the format attribute. In an example of FIG. 9, the "table" tag is given a tag identifier "table_border=0&cellpadding=1", which combines a tag name "table" and format attributes and their values 'border="0" cellpadding="1"'. If there are two or more format attributes, they are arranged in a predetermined order of the format attribute names to normalize the tag identifier. The tag identifier obtained in this manner is used as an identifier of a partial tree, and is matched with a corresponding tree-structure element. Tree-structure data inclusive of partial tree identifiers as shown in FIG. 9 is then send to the document structuring unit 13.

At step A20, the portion specifying unit 12 isolates a portion selected by the user through user interface that provides the user with a means of easy selection as shown in FIG. 7. The procedure then goes to step A30.

At step A30, the portion specifying unit 12 obtains a partial tree identifier corresponding to the selected portion form the coordinates or the like of a selected area as shown in FIG. 8. The obtained partial tree identifier and the document URL are stored as a pair in the portion-information storage unit 2, and the document portion ID corresponding to the stored pair is acquired.

In what follows, the portion identification process B will be described.

At step B10, the partial-tree-identifier identifying unit 42 receives a portion retrieval request together with a document portion ID from the user. The partial-tree-identifier identifying unit 42 transfers the document portion ID to the portion-information storage unit 2 to obtain the relevant URL and the corresponding partial tree identifier. The procedure then goes to step B20.

At step B20, the partial-tree-identifier identifying unit 42 obtains a document corresponding to the obtained URL by using the document retrieval unit 41. The partial-tree-identifier identifying unit 42 passes the obtained document to the document structuring unit 43, and issues a document structuring request. The procedure proceeds to step M10.

At step M10, the tree-structure conversion unit 31 receives the structured document from the document structuring unit 43, and converts the document into a tree structure inclusive of document tags and texts. The tree-structure conversion unit 31 supplies the tree structure to the partial-tree-identifier generating unit 32. The procedure proceeds to step M20.

At step M20, the partial-tree-identifier generating unit 32 generates a tag identifier for each tag constituting the document that is converted into the tree structure by the tree-structure conversion unit 31. The tag identifier is comprised of a tag name, a name of a format attribute, and a value of the format attribute. In an example of FIG. 9, the "table" tag is given a tag identifier "table_border=0&cellpadding=1", which combines a tag name "table" and format attributes and their values 'border="0" cellpadding="1"'. If there are two or more format attributes, they are arranged in a predetermined order of the format attribute names to normalize the tag identifier. The tag identifier obtained in this manner is used as an identifier of a partial tree, and is matched with a corresponding tree-structure element. Tree-structure data inclusive of partial tree identifiers as shown in FIG. 9 is then send to the document structuring unit 43. The procedure then goes to B30.

At B30, the partial-tree-identifier identifying unit 42 finds a tag corresponding to the obtained partial tree identifier from the list of elements of the converted tree structure as shown in FIG. 11. If no corresponding partial tree structure identifier is found, the procedure comes to an end. If a corresponding partial tree structure identifier is found, the procedure proceeds to step B40.

At step B40, the partial-tree-identifier identifying unit 42 provides the user with a document portion belonging to a partial tree that corresponds to the obtained partial tree identifier.

Second Embodiment

Figure 14:
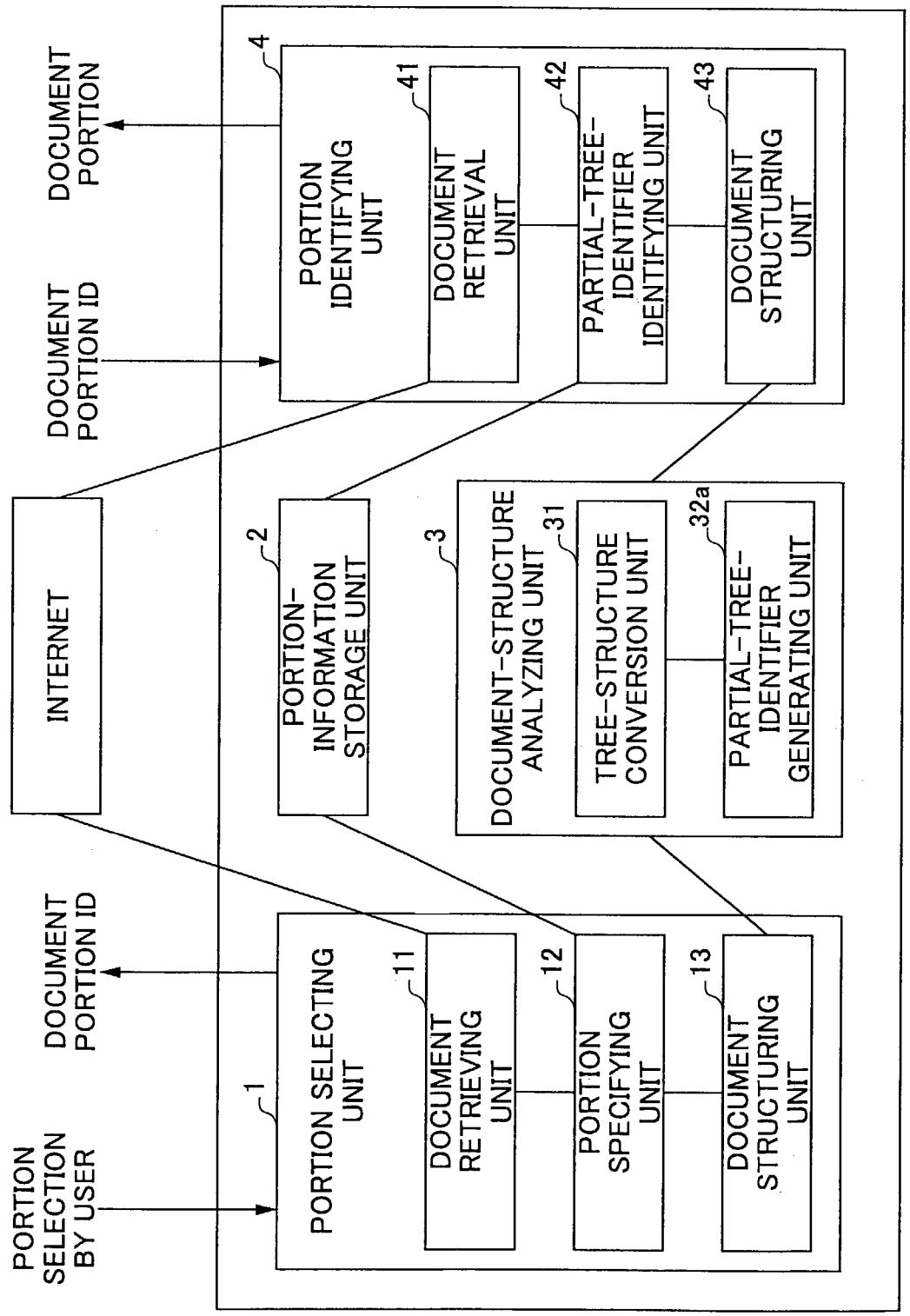
FIG. 14 is a block diagram of a system for extracting information from a structured document according to a second embodiment of the present invention.

FIG. 14 is a block diagram of a system for extracting information from a structured document according to a second embodiment of the present invention.

The system as shown is directed to a configuration that can uniquely identify a selected portion even if the same combination of a tag and format attributes that corresponds to the root of a selected partial tree is used for other tags in the document.

The configuration of the second embodiment is identical to that of the first embodiment, except for a partial-tree-identifier generating unit 32a of the document-structure analyzing unit 3. A description of the identical portion will be omitted in the following.

The partial-tree-identifier generating unit 32a generates a tag identifier for each tag constituting the document that is converted into the tree structure by the tree-structure conversion unit 31. The tag identifier is comprised of a tag name, a name of a format attribute, and a value of the format attribute. In an example of FIG. 15, the first "table" tag is given a tag identifier "table_border=0 &cellpadding=1", which combines a tag name "table" and format attributes and their values 'border="0" cellpadding="1"'. If there are two or more format attributes, they are arranged in a predetermined order of the format attribute names to normalize the tag identifier.

Figure 15:
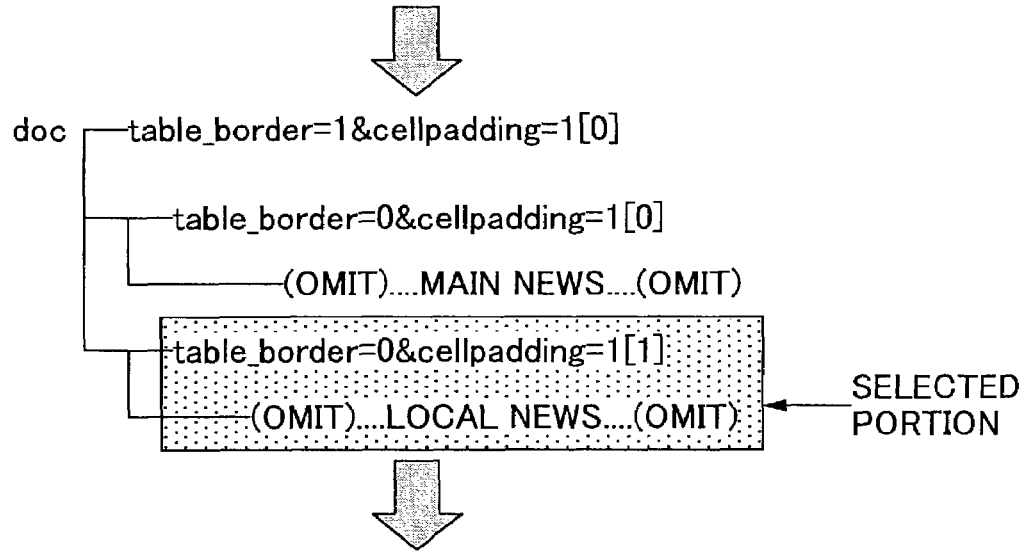
FIG. 15 is an illustrative drawing showing the generation of a partial tree identifier of a selected portion according to a second embodiment of the present invention.

Numerical value indexes are then generated that indicate the sequence numbers of tag identifiers belonging to the same hierarchical level of the tree structure. A tag identifier and a numerical value index are paired as a set, and a plurality of sets are connected in series from the root of the whole tree structure to the root of a partial tree, thereby providing the identifier of the partial tree as shown in FIG. 15. The tree-structure data inclusive of partial tree identifiers as shown in FIG. 16 is then supplied to the document structuring unit 13 or 43.

Figure 17:
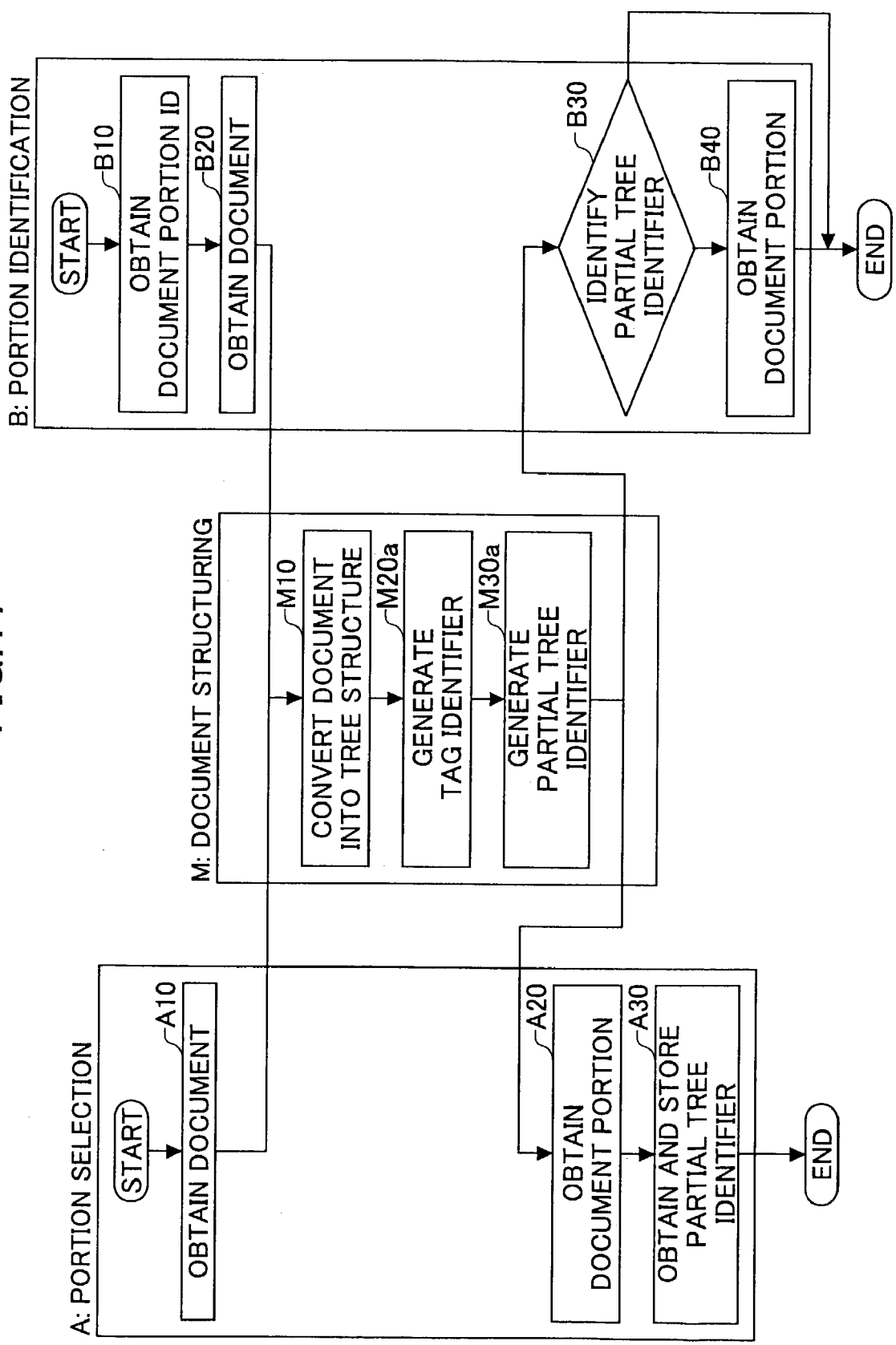
FIG. 17 is a flowchart of a method of extracting information from a structured document according to the second embodiment of the present invention.

FIG. 17 is a flowchart of a method of extracting information from a structured document according to the second embodiment of the present invention.

In the following, a description will be omitted in respect of steps other than step M20a as these steps are identical to those of the first embodiment.

At step M20a, the partial-tree-identifier generating unit 32a generates a tag identifier for each tag constituting the document that is converted into the tree structure by the tree-structure conversion unit 31. The tag identifier is comprised of a tag name, a name of a format attribute, and a value of the format attribute. In the example of FIG. 15, the first "table" tag is given a tag identifier "table_border=0&cellpadding=1", which combines a tag name "table" and format attributes and their values 'border="0" cellpadding="1"'. If there are two or more format attributes, they are arranged in a predetermined order of the format attribute names to normalize the tag identifier. The procedure then goes to step M30a.

At step M30a, the partial-tree-identifier generating unit 32a generates numerical value indexes that indicate the sequence numbers of tag identifiers belonging to the same hierarchical level of the tree structure, and combines each tag identifier with a corresponding numerical value index as a set. A plurality of sets are connected in series from the root of the whole tree structure to the root of a partial tree, thereby providing the identifier of the partial tree as shown in FIG. 15. The tree-structure data inclusive of partial tree identifiers as shown in FIG. 16 is then supplied to the document structuring unit 13 or 43. The procedure then proceeds to step A20 or step B30.

Third Embodiment

Figure 18:
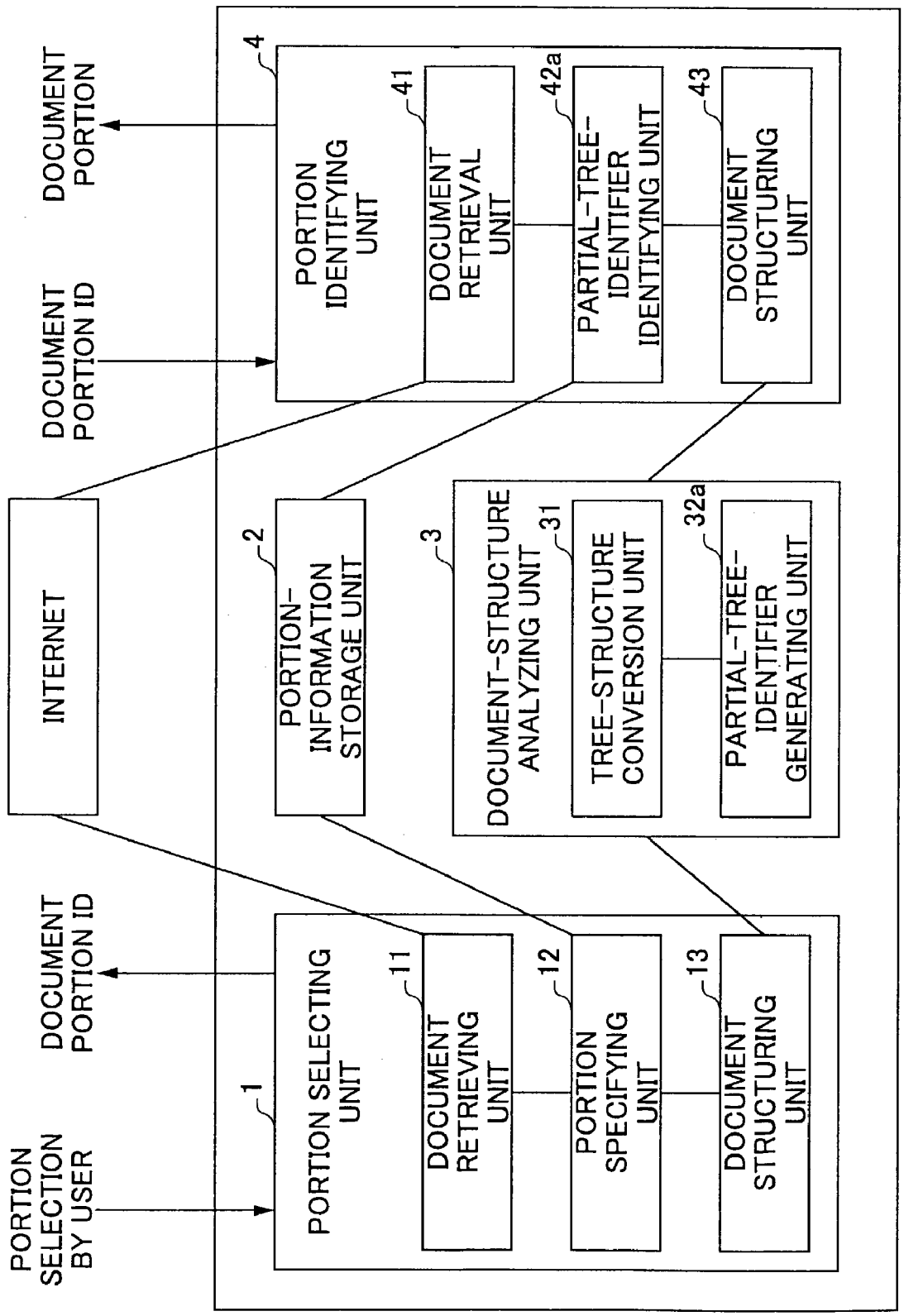
FIG. 18 is a block diagram of a system for extracting information from a structured document according to a third embodiment of the present invention.

FIG. 18 is a block diagram of a system for extracting information from a structured document according to a third embodiment of the present invention.

The system as shown is directed to a configuration that can avoid the degradation of reliability of portion extraction even if an open-ended tag exists above the selected portion.

The configuration of the third embodiment is identical to that of the first embodiment, except for a partial-tree-identifier identifying unit 42a. A description of the identical portion will be omitted in the following.

The partial-tree-identifier identifying unit 42a receives a portion retrieval request with a document portion ID from a user, and passes the document portion ID to the portion-information storage unit 2 to obtain the relevant URL and the corresponding partial tree identifier. The URL is then transferred to the document retrieval unit 41 to obtain the corresponding document. The partial-tree-identifier identifying unit 42a sends a request to the document structuring unit 43 to structure the received document, thereby obtaining a list of elements of the converted tree structure as shown in FIG. 16.

The partial tree identifier obtained from the portion-information storage unit 2 needs to be identified from a list of partial tree identifiers of the obtained elements. A tag identifier located at the end of the identifier is used alone for the matching purpose. In the case of "doc.table_border=1&cellpadding=1[0].table_border=0& cellpadding=1[1]", for example, a tag identifier at the end of the partial tree identifier refers to "table_border=0 &cellpadding=1[1]" provided at the end of the string. When there are two or more candidates that match the selected partial tree, the numerical value indexes associated with the tag identifiers are referred to in order to screen the candidates.

If more than one candidate still remains after the screening of candidates based on the utilization of the numerical value index, a parent-node tag is then taken into consideration for matching of identifiers. The matching of identifiers is recursively performed by ascending to successive ancestor nodes until only one partial tree remains as a candidate. This remaining tree is identified as the selected partial tree. The user is provided with a document portion belonging to the partial tree that corresponds to the identified partial tree identifier.

FIG. 19 is a flowchart of a method of extracting information from a structured document according to the third embodiment of the present invention. In the following, a description will be omitted in respect of steps other than steps B30a through B90a to avoid a duplicate description identical to that of the first embodiment.

At B30a, the partial-tree-identifier identifying unit 42 needs to identify the partial tree identifier obtained from the portion-information storage unit 2 from the list of elements of the converted tree structure as shown in FIG. 16. To this end, the partial-tree-identifier identifying unit 42 chooses a tag identifier at the end of the identifier for use as a matching element. In the case of "doc.table_border=1&cellpadding=1 [0]. table_border=0 &cellpadding=1[1]", for example, a tag identifier at the end of the partial tree identifier refers to "table_border=0 &cellpadding=1[1]" provided at the end of the string. After this tag identifier is chosen, the procedure goes to step B40a.

At step B40a, the matching of tag identifiers is performed with respect to the currently chosen tag identifier. If there are two ore more candidates that match the obtained partial tree identifier, the procedure goes to step B50a. Alternatively, if there is only one candidate, the procedure goes to step B60a. Alternatively, if there is no candidate, the procedure comes to an end.

At step B50a, the screening of the candidates is performed by referring to the numerical value indexes associated with the tag identifier. If two or more candidates still remain after screening, the procedure proceeds to step B80a. Alternatively, if only one candidate remains, the procedure goes to step B60a. If there is no candidate, the procedure comes to an end.

At step B60a, since there is only one candidate that matches the obtained partial tree identifier, this candidate partial tree is identified as the selected partial tree, followed by proceeding to step B70a.

At step B70a, the partial-tree-identifier identifying unit 42 provides the user with a document portion belonging to the partial tree that corresponds to the obtained partial tree identifier.

At step B80a, since two or more candidates remain even after screening based on the utilization of numerical value indexes, a next matching element is chosen by ascending to the higher level. Namely, if the tag identifier "table_border=0&cellpadding =1[1]" at the end of "doc.table_border=1&cellpadding =1[0]. table_border=0&cellpadding=1[1]" is used first, then, a parent tag identifier "table_border=1& cellpadding=1[0]" is chosen as a next matching element. The procedure then proceeds to step B90a.

At step B90a, a check is made as to whether no more matching element exists by ascending to the next higher level at step B80a after using the tag at the highest level as a matching element. If no more matching element exists, the procedure comes to an end. Otherwise, the procedure goes back to step B40a.

The methods of the embodiments as described above may be implemented as programs, which are installed in a computer that is to be used as an apparatus for extracting information. Such programs may be distributed through networks.

These programs may be stored in a hard-disk drive or a removable memory medium such as a flexible disk, a CD-ROM, or the like that is connected to the computer used as an information extracting apparatus, and may be loaded to the memory at the time of using the method of the invention.

Figure 20:
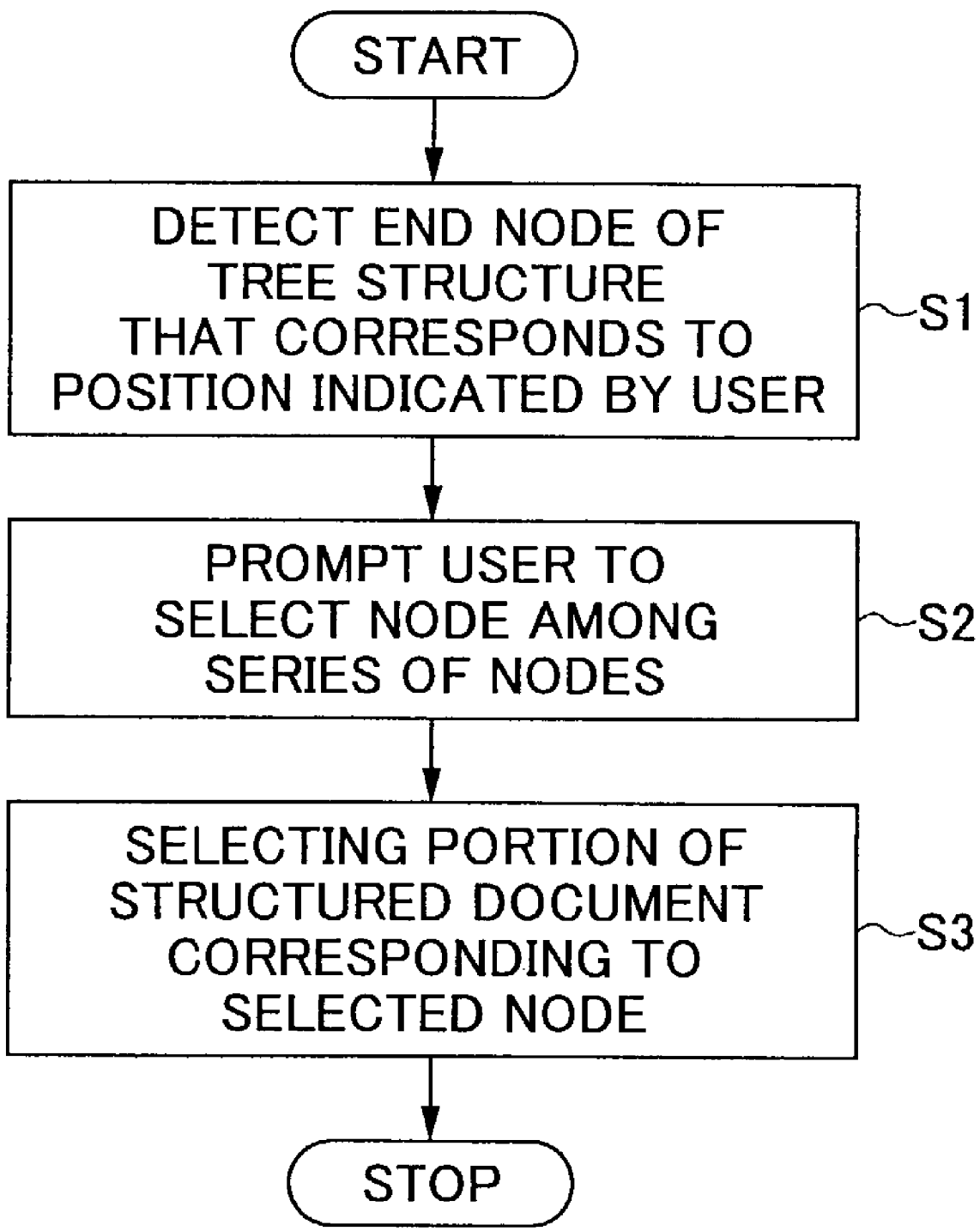
FIG. 20 is a flowchart showing a schematic of a user interface of the present invention.

FIG. 20 is a flowchart showing a schematic of the present invention that provides a user with a user interface for easy selection of a portion of a structured document such as an HTML document in a manner that is intuitively easy to understand.

The present invention is directed to a method of selecting and extracting a portion of a structured document such as an HTML document. An end node at an end of a tree structure is identified that corresponds to a position indicated by a user on the screen that is displaying a document (step 1). The user is invited to select a node among a series of nodes that are obtained by successively detecting higher nodes from the end node (step 2). Then, a portion of the structured document corresponding to the user-selected node is selected (step 3).

Figure 21:
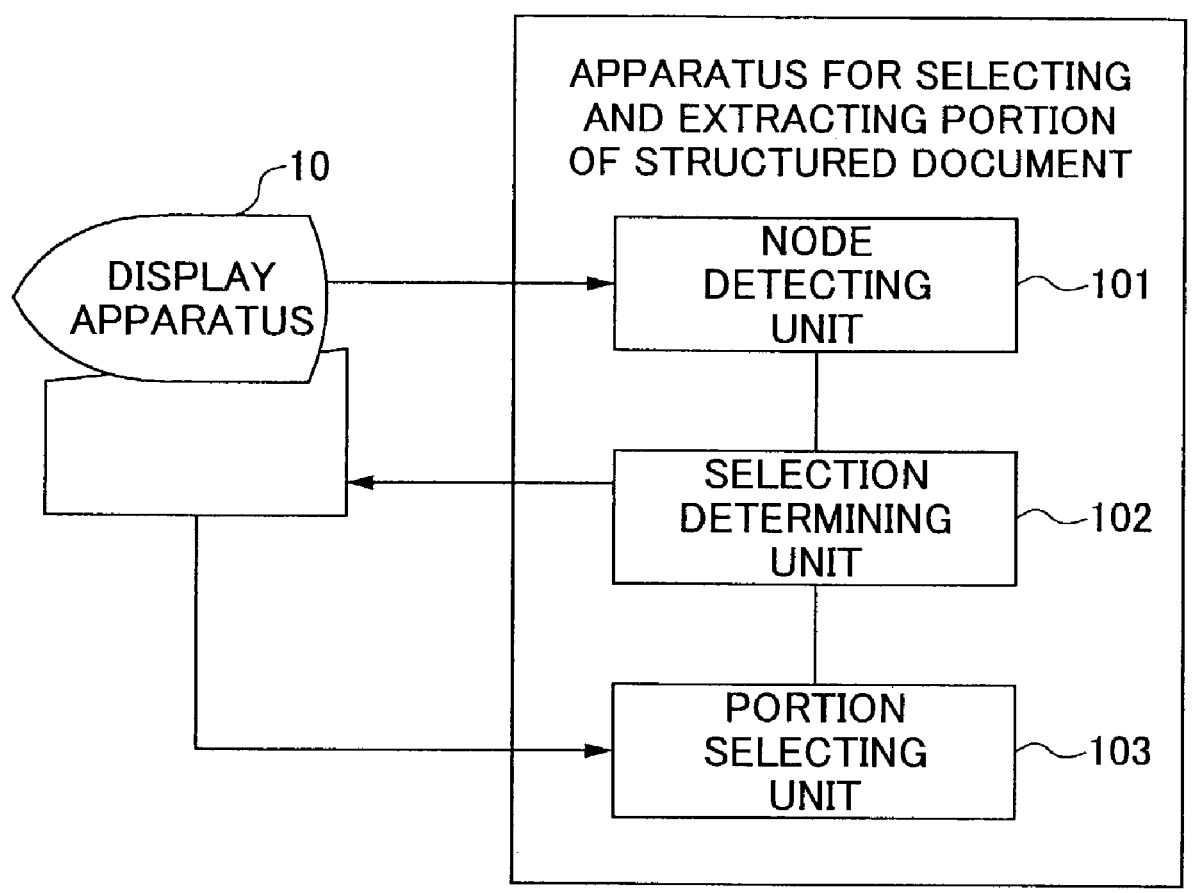
FIG. 21 is a block diagram of a schematic user interface according to the present invention.

FIG. 21 is a block diagram of a schematic user interface according to the present invention.

An apparatus for selecting and extracting a portion of a structured document such as an HTML document includes a node detecting unit 101 for detecting an end node of a tree structure that corresponds to a position indicated by a user on the document-displayed screen, a selection determining unit 102 for prompting the user to select a node from a series of nodes that are obtained by successively detecting higher nodes from the end node, and a portion selecting unit 103 for selecting the portion of the structured document that corresponds to the user-selected node.

Figure 22:
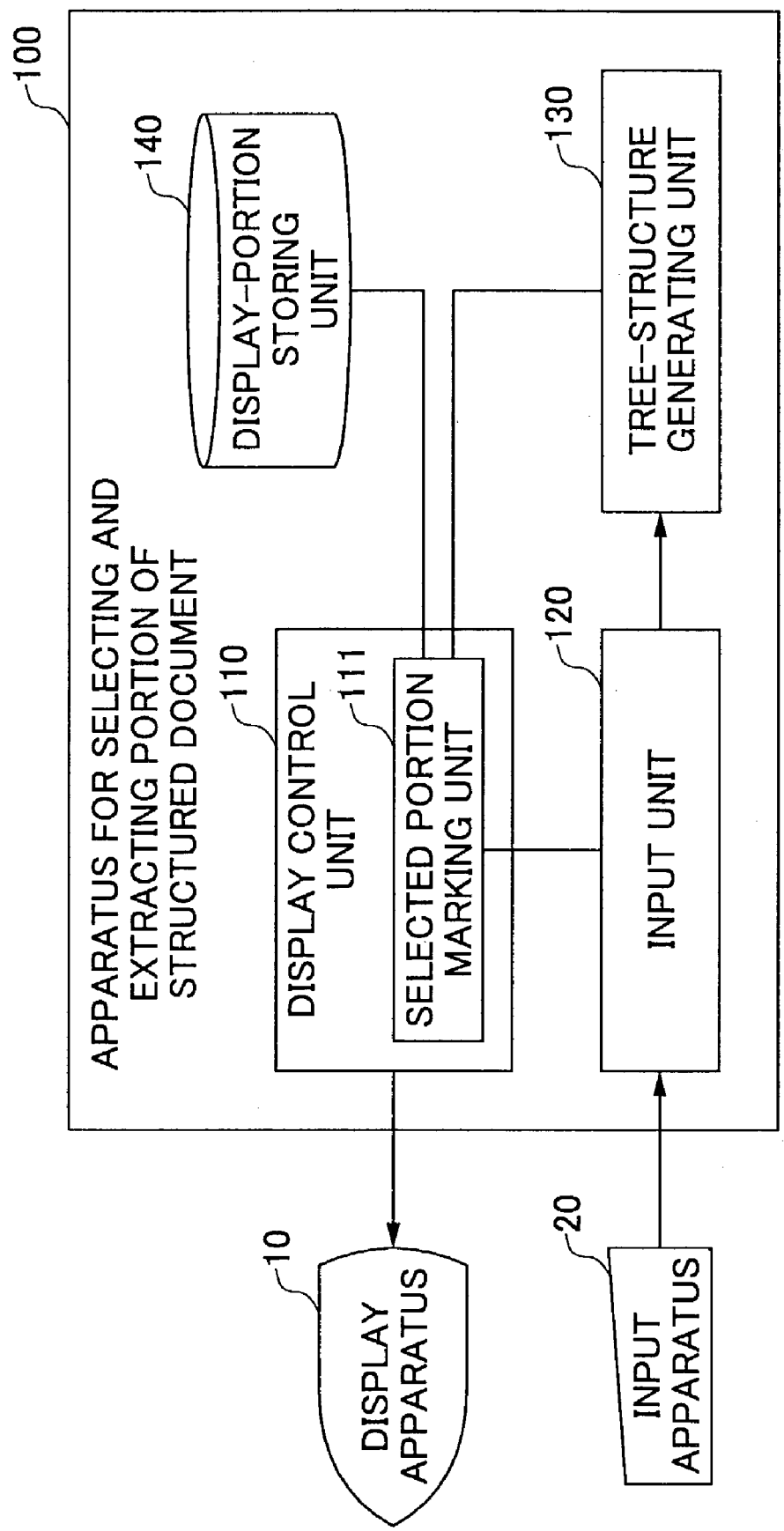
FIG. 22 is a block diagram of an apparatus according to an embodiment of the present invention.

FIG. 22 is a block diagram of an apparatus according to an embodiment of the present invention.

An apparatus 100 for selecting and extracting a portion of a structured document includes a display control unit 110 inclusive of a selected portion marking unit 111, an input unit 120, a tree-structure generating unit 130, and a display-portion storing unit 140. A display apparatus 10 and an input apparatus 20 are connected to the apparatus 100.

The display apparatus 10 displays HTML text and images that are processed by a browser.

The input apparatus 20 receives information specified by a user through button operation or the like. Such button operation includes area enlargement (+), size reduction (−) clear (clear), and select (select).

The selected portion marking unit 111 of the display control unit 110 displays an object that is selected by a user button operation from objects at various levels of the tree structure. A portion selected as a desired portion by the user is stored in the display-portion storing unit 140 as a HTML text, for example.

The input unit 120 receives user inputs (inputs through button operations) from the input apparatus 20, and passes the input information to the tree-structure generating unit 130 and the selected portion marking unit 111.

The tree-structure generating unit 130 finds an object located at a position clicked by the user by selecting the object among objects that constitute the whole tree structure of the HTML document. The object found is stored in an array of objects.

Figure 23:
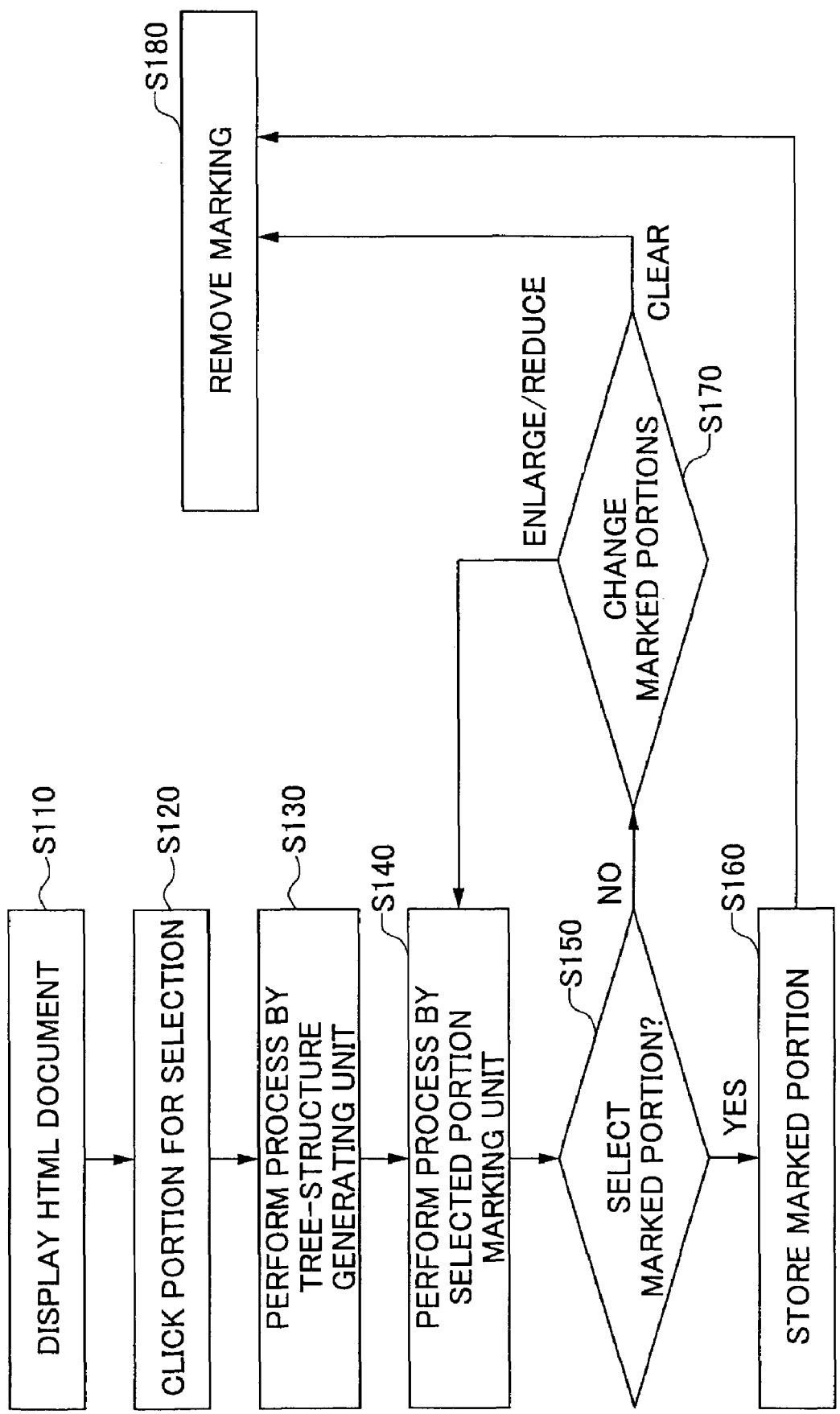
FIG. 23 is a flowchart of a method of selecting and extracting a portion according to an embodiment of the present invention.

FIG. 23 is a flowchart of a method of selecting and extracting a portion according to an embodiment of the present invention.

Figure 24:
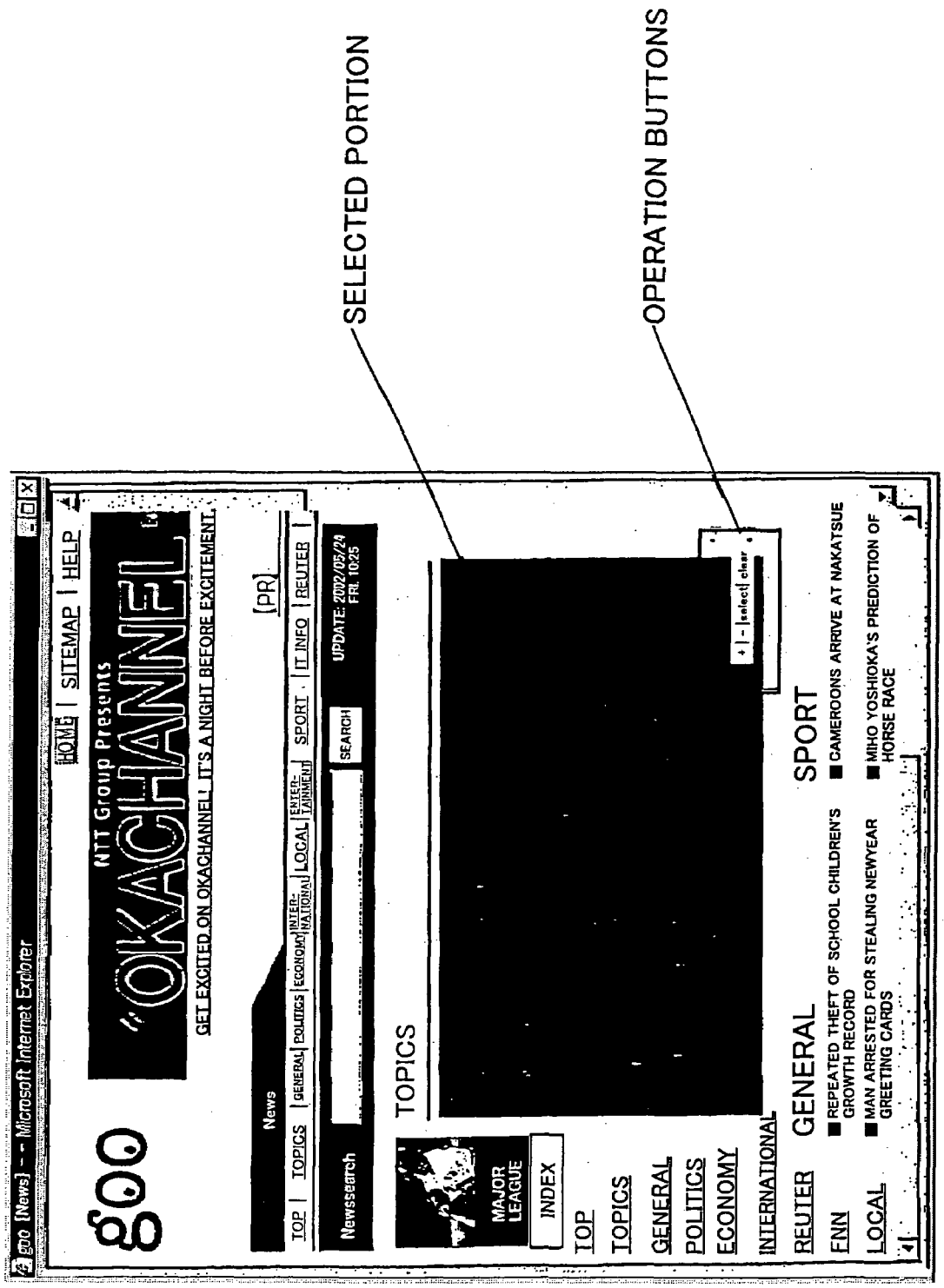
FIG. 24 is an illustrative drawing showing an example of a portion selection on a browser according to the embodiment of the present invention.

At step 110, an HTML document to be processed is displayed in the browser window of the user terminal. At step 120, the user clicks a portion that the user wishes to select on the screen. At step 130, the tree-structure generating unit 130 extracts an object corresponding to the clicked position from the objects that constitute the HTML tree structure. A rectangular area corresponding to the extracted object is marked on the document displayed on the screen as shown in FIG. 24.

If the user determines the marked portion as his/her selection, the marked portion is stored in the display-portion storing unit 140 as an HTML text (step 160). Then, marking on the document is removed (step 180). If the user chooses not to select the marked portion, the user can enlarge ("+"), reduce ("−"), or clear ("clear") the marked area by operating the buttons shown on the screen (step 170). Through these button operations, objects belonging to upper levels or lower levels of the tree structure are successively displayed. When a desired portion is marked on the screen, the marked portion is selected at step 150 by the select button ("select"). The selected portion is stored in the display-portion storing unit 140 as an HTML text (step 160).

The procedure described above may be performed by a browser. In such a case, the HTML to be processed is provided with additional scripts written in Java Script, and is fed into the browser.

In the following, the operation of the tree-structure generating unit 130 will be described.

Figure 25:
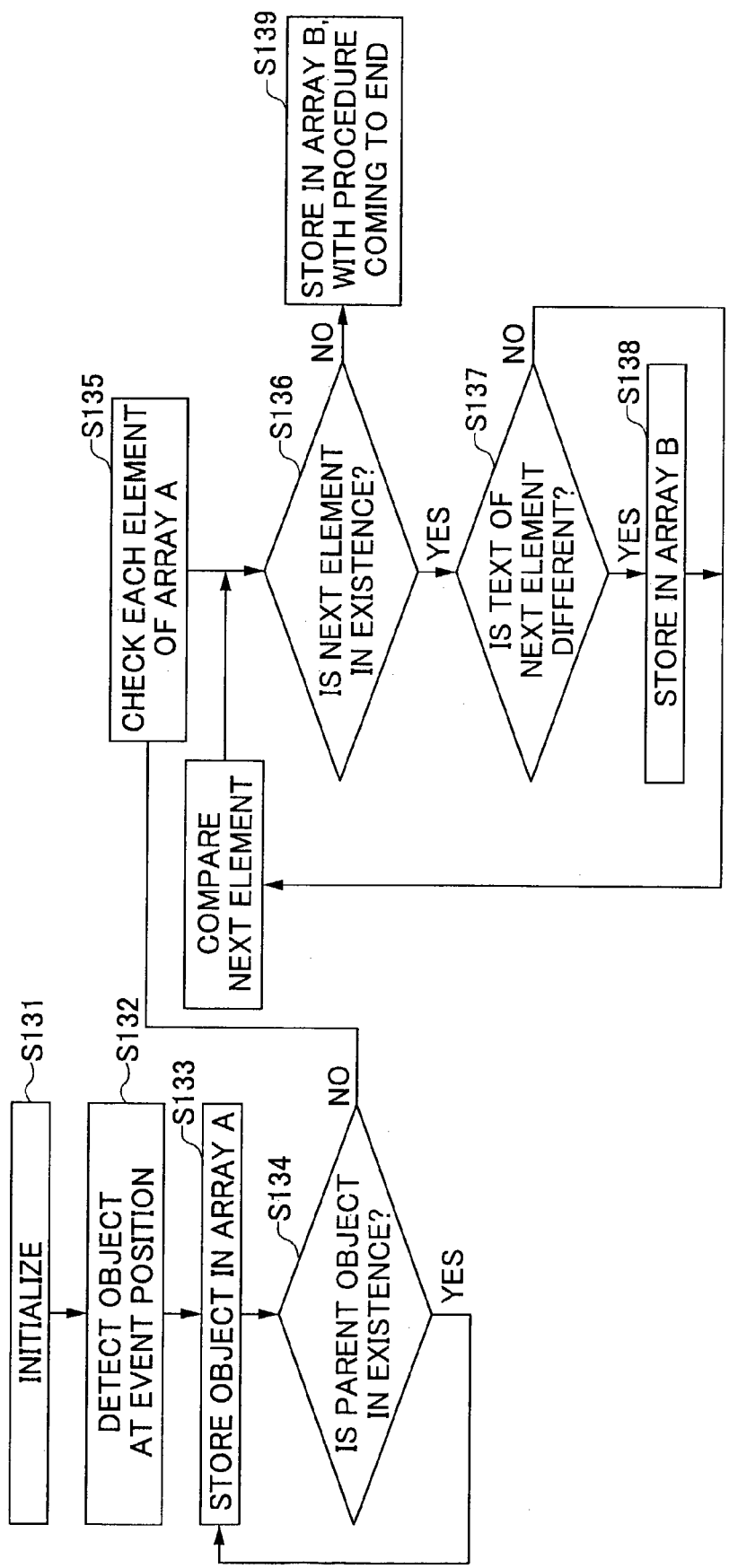
FIG. 25 is a flowchart showing an operation of a tree-structure generating unit according to the embodiment of the present invention.

FIG. 25 is a flowchart showing an operation of the tree-structure generating unit according to an embodiment of the present invention.

An array is initialized (step 131). An object located at a clicked position is detected (step 132), and is stored in the array (step 133). Here, objects are part of the HTML document, and correspond to respective nodes of a tree structure. On the screen, there are areas that belong to respective objects. In the example of FIG. 29, a tree structure is comprised of 13 nodes in total. If the detected object has a parent object (YES at step 134), this parent object is also stored in the array as an object belonging to the same clicked position (step 133). This process is carried out with respect to all the object layers, generating an object array a corresponding to the clicked position. A click on "apple" in FIG. 29 will result in objects "k, j, i, h, f, e, d, and a" being stored in the array a.

Each element of this array is checked (step 135). This is intended to select an object of the highest level among objects that cannot be distinguished from each other from their appearance on the screen. Such cases occur when texts and images belonging to an object as well as texts and areas corresponding to the object are identical to those of other objects.

If there is a next element, a check is made as to whether a text belonging to the next element is different (step 137). If it is different, the object is stored in an array b (step 138). Then, a check is made again as to whether there is a next element (step 136). If no next element exists, the object is stored in the array b (step 139). With this, the procedure comes to an end.

In this manner, the array b of objects is obtained where these objects correspond to the clicked position and are distinguishable from each other on the screen.

In the example of FIG. 29, "k" and "j" have the same text "apple" belonging to them, and "j" that is at the higher level is stored in the array b. "i" and "h" have the same texts "apple" and "orange" belonging to them, and "h" that is at the higher level is stored in the array b. In this example, "i", "h", and "a" will be stored in the array b.

In what follows, the selected portion marking unit 111 will be described.

Figure 26:
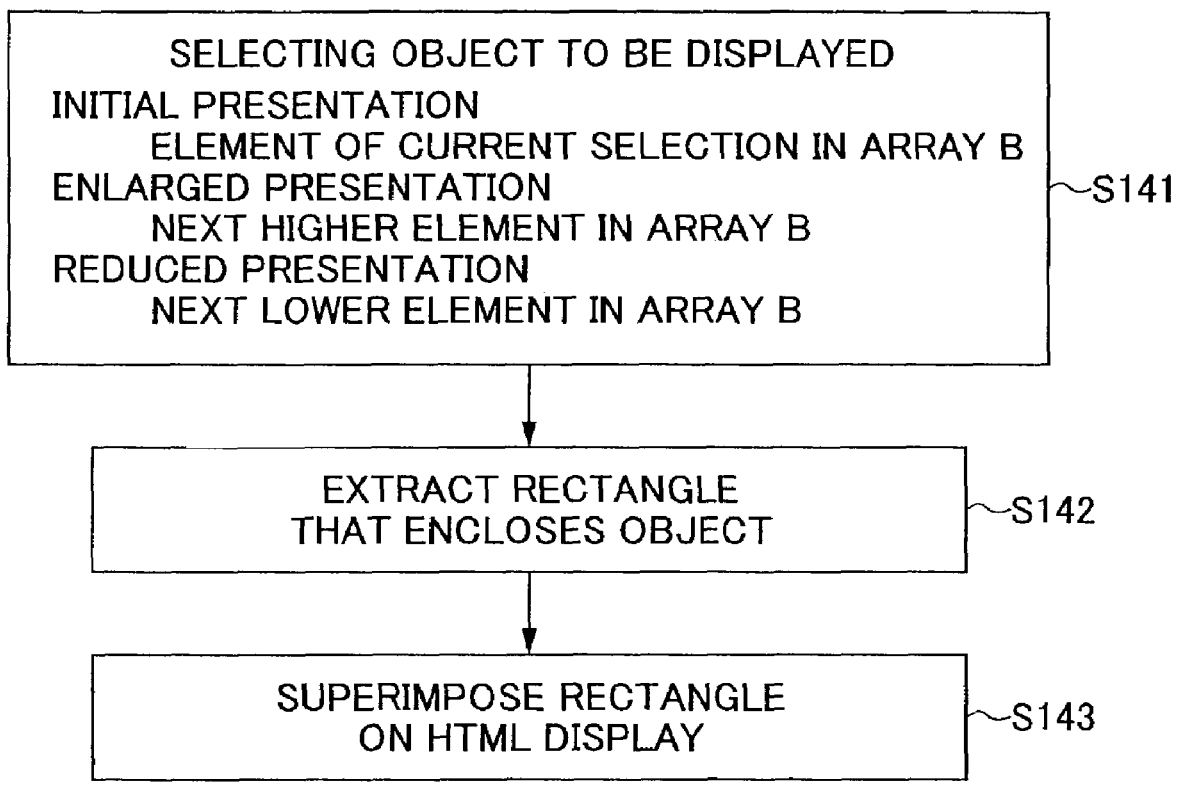
FIG. 26 is a flowchart of an operation of the selected portion marking unit according to the embodiment of the present invention.

FIG. 26 is a flowchart of an operation of the selected portion marking unit 111 according to an embodiment of the present invention.

An object to be displayed is selected (step 141). In the case of initial presentation, a current element of the array b will be selected. In the case of enlarged presentation, an element of the array b next higher than the current element will be selected. In the case of reduced-size presentation, an element of the array b next lower than the current element will be selected.

Figure 27:
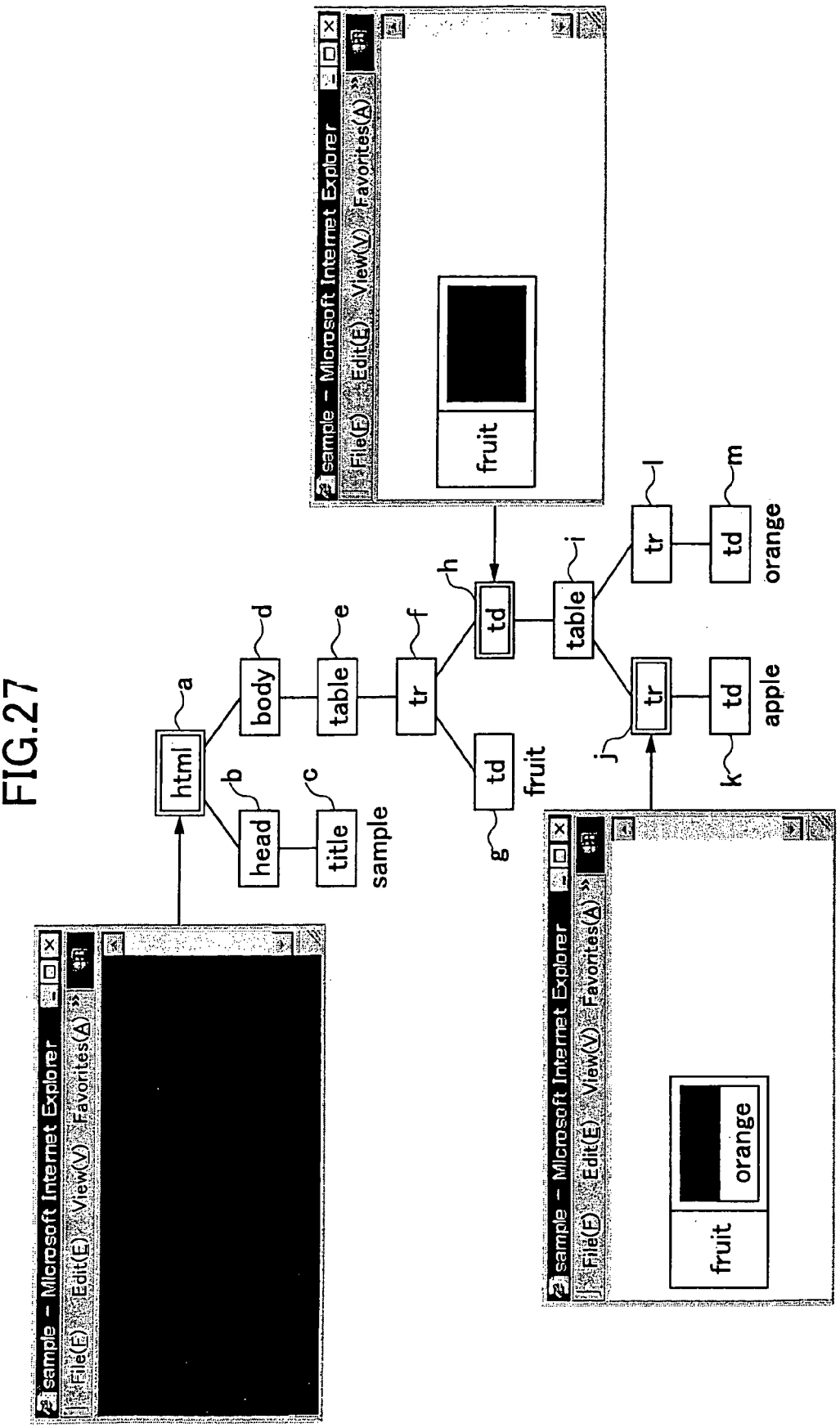
FIG. 27 is an illustrative drawing showing an example of a tree structure and the associated presentation of selected portions according to the embodiment of the present invention.

At the initial presentation, a rectangular shape is extracted that corresponds to the lowest-level object of the object array b (step 142). The extracted rectangle is superimposed on the screen as shown in FIG. 24 (step 143). Among the buttons shown in FIG. 24, the enlargement button "+" will select an object next higher than the object corresponding to the currently selected area, resulting in the rectangle of the newly selected object being superimposed on the screen. By the same token, the size-reduction button "−" will select the next lower object. With regard to the example of FIG. 29, a rectangle area is superimposed on the display with respect to a corresponding object selected from the array b as shown in FIG. 27.

In the following, a system construction in its entirety will be described.

Figure 28:
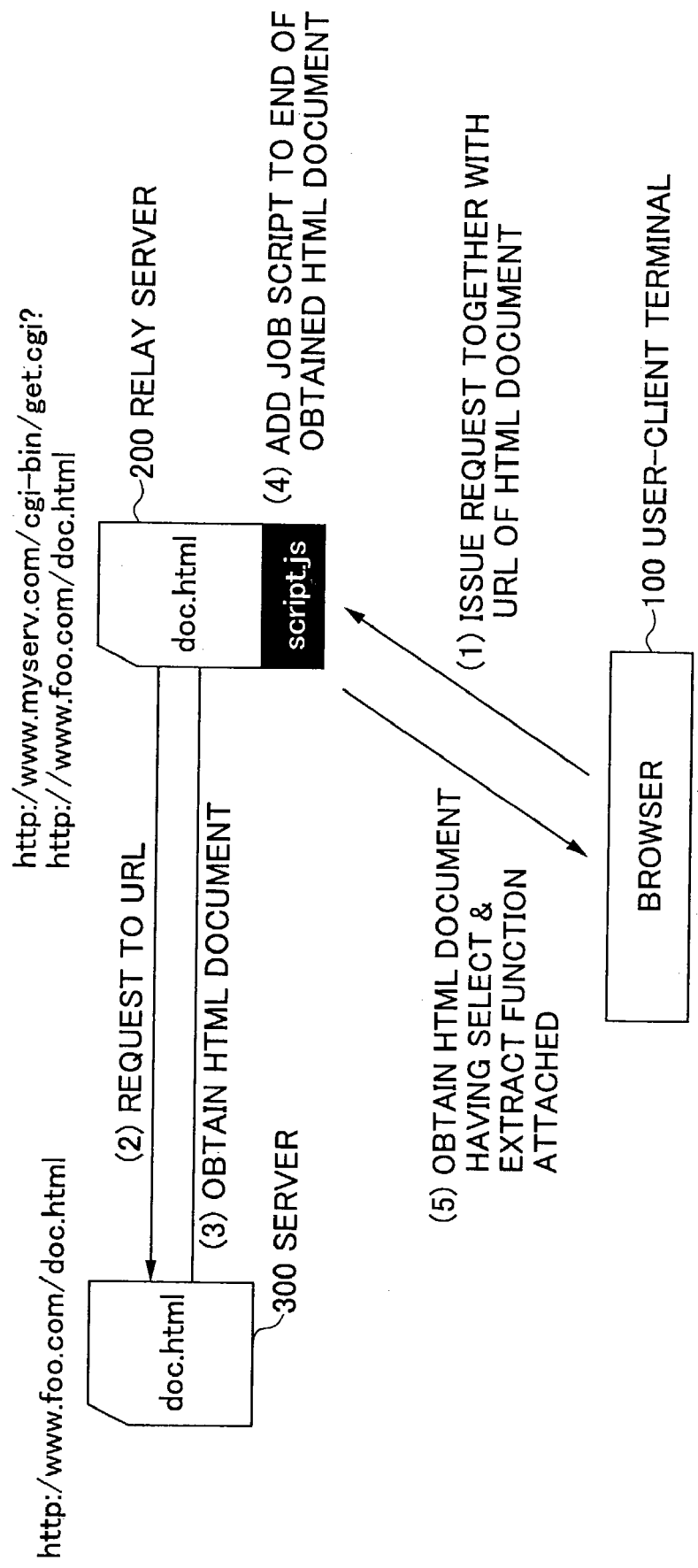
FIG. 28 is an illustrative drawing showing a construction of the system according to an embodiment of the present invention.

FIG. 28 is an illustrative drawing showing a construction of the system according to an embodiment of the present invention.

The system shown in FIG. 28 includes a user client terminal 100 (apparatus for selecting and extracting a portion from a structured document), a relay server 200, and a server 300 which stores an HTML document subjected to processing.

In respect of the HTML document subjected to processing, the relay server 200 "http://www.myserv.com/cgi-bin/get.cgi?http:/www.foo.com/doc/html" is provided for the purpose of allowing the operations as described above to be performed on the same screen that shows "http://www.foo.com/doc.html".

In the following description, numbers bracketed in "( )" correspond to respective numbers bracketed in "( )" in FIG. 28.

(1) From the client terminal 100, the user starts the CGI of the relay server 200 with reference to the URL of the HTML document subjected to processing.

(2) The relay server 200 sends a request to the server 300 by using the URL.

(3) The server 300 transmits the HTML document to the relay server 200.

(4) The relay server 200 adds a job script to the end of the HTML document obtained from the server 300.

(5) The relay server 200 transmits the HTML document to the client terminal 100 where the HTML document has an attached function for selecting and extracting a document portion.

In this manner, the client terminal 100 can process the HTML document with the attached function of selecting and extracting a document portion.

Components of the apparatus for selecting and extracting a structured-document portion as described in these embodiments may be implemented as programs, which are installed in a computer that is to be used as an apparatus for selecting and extracting a structured-document portion. Such programs may be distributed through networks.

These programs may be stored in a hard-disk drive or a removable memory medium such as a flexible disk, a CD-ROM, or the like that is connected to the computer used as the apparatus for selecting and extracting a structured-document portion, and may be loaded to the memory at the time of using the method of the invention.

Further, the present invention is not limited to these embodiments, but various variations and modifications may be made without departing from the scope of the present invention.

The present application is based on Japanese priority application No. 2002-190621 filed on Jun. 28, 2002, and Japanese priority application No. 2002-204641 filed on Jul. 12, 2002, with the Japanese Patent Office, the entire contents of which are hereby incorporated by reference.

What is claimed is:

1. A method of extracting a portion of a structured document having a corresponding tree structure stored in memory, said method comprising the steps of:

displaying the structured document on a screen;

detecting a position of the structured document indicated by a user on the screen;

detecting an end node of the tree structure that corresponds to the position indicated by the user on the screen;

obtaining a series of nodes of the tree structure stored in the memory by successively detecting next higher nodes from the end node;

superimposing a rectangular area corresponding to a given node of the obtained nodes of the structured document displayed on the screen;

prompting the user to change the rectangular area by enlarging or reducing a size of the rectangular area through user operation of operation buttons displayed on the screen for requesting enlargement or reduction, respectively, so as to display the enlarged rectangular area or reduced rectangular area on the structured document displayed on the screen without enlarging or reducing the displayed structured document, the enlarged rectangular area corresponding to one of the obtained nodes higher than the given node, and the reduced rectangular area corresponding to one of the obtained nodes lower than the given node;

prompting the user to perform a select operation to select using the operation buttons of the desired rectangular area on the structured document when the desired rectangular area is displayed through the user operation for requesting selection enlargement or reduction;

extracting, in the tree structure stored in the memory, a portion of the structured document that corresponds to one of the obtained nodes corresponding to the desired rectangular area selected by the user; and providing the user with the extracted portion of the structured document.

2. The method as claimed in claim 1, further comprising the steps of:

transferring the structured document indicated by a user-specified URL to a relay server;

attaching a script inclusive of a function to select and extract a document portion to the structured document at said relay server; and transferring the structured document having the attached script from said relay server to a user terminal, wherein said steps of detecting the end node, prompting, and extracting are performed by use of the attached script at said user terminal.

3. An apparatus for extracting a portion of a structured document having a corresponding tree structure stored in memory, said apparatus comprising:

a display control unit configured to display the structured document on a screen;

an input unit configured to detect a position of the structured document indicated by a user on the screen;

a node detecting unit configured to detect an end node of the tree structure that corresponds to the position indicated by the user on the screen;

a selection determining unit configured to: obtain a series of nodes of the tree structure stored in the memory by successively detecting next higher nodes from the end node, to superimpose a rectangular area corresponding to a given node of the obtained nodes of the structured document displayed on the screen, to prompt the user to change the rectangular area by enlarging or reducing a size of the rectangular area through user operation of operation buttons displayed on the screen for requesting enlargement or reduction, respectively, so as to display an enlarged rectangular area or reduced rectangular area on the structured document displayed on the screen without enlarging or reducing the displayed structured document, the enlarged rectangular area corresponding to one of the obtained nodes higher than the given node, and the reduced rectangular area corresponding to one of the obtained nodes lower than the given node, and to prompt the user to perform a select operation to select a desired rectangular area on the structured document when the desired rectangular area is displayed through the user operation for requesting selection enlargement or reduction; and a portion extracting unit configured to extract, in the tree structure stored in the memory, a portion of the structured document that corresponds to one of the obtained nodes corresponding to the desired rectangular area selected by the user, and to provide the user with the extracted portion of the structured document.

4. The apparatus as claimed in claim 3, further comprising:

a first unit configured to transfer the structured document indicated by a user-specified URL to a relay server;

a second unit configured to attach a script inclusive of a function to select and extract a document portion to the structured document at said relay server; and a third unit configured to transfer the structured document having the attached script from said relay server to a user terminal, wherein said node detecting unit, said selection determining unit, and said portion extracting unit operate by use of the attached script at said user terminal.

5. A computer readable medium having a program embodied therein for causing a computer to extract a portion of a structured document having a corresponding tree structure stored in memory, said program comprising the steps of: displaying the structured document on a screen;

detecting a position of the structured document indicated by a user on the screen;

detecting an end node of the tree structure that corresponds to the position indicated by the user on the screen;

obtaining a series of nodes of the tree structure stored in the memory by successively detecting next higher nodes from the end node;

superimposing a rectangular area corresponding to a given node of the obtained nodes of the structured document displayed on the screen;

prompting the user to change the rectangular area by enlarging or reducing a size of the rectangular area through user operation of operation buttons displayed on the screen for requesting enlargement or reduction, respectively, so as to display an enlarged rectangular area or reduced rectangular area on the structured document displayed on the screen without enlarging or reducing the displayed structured document, the enlarged rectangular area corresponding to one of the obtained nodes higher than the given node, and the reduced rectangular area corresponding to one of the obtained nodes lower than the given node;

prompting the user to perform a select operation to select using the operation buttons a desired rectangular area on the structured document when the desired rectangular area is displayed through the user operation for requesting selection enlargement or reduction;

extracting, in the tree structure stored in the memory, a portion of the structured document that corresponds to one of the obtained nodes corresponding to the desired rectangular area selected by the user; and providing the user with the extracted portion of the structured document.

6. The computer readable medium as claimed in claim 5, said program further comprising the steps of:
- transferring the structured document indicated by a user-specified URL to a relay server;
- attaching a script inclusive of a function to select and extract a document portion to the structured document at said relay server; and
- transferring the structured document having the attached script from said relay server to a user terminal, wherein said steps of detecting the end node, prompting, and extracting are performed by use of the attached script at said user terminal.

* * * * *